INVENTOR.
ROBERT MARIE
BY
ATTORNEYS

Nov. 12, 1968  R. MARIE  3,410,361
VEHICLE SPEED CONTROL DEVICE
Filed Sept. 28, 1966  8 Sheets-Sheet 2

INVENTOR.
ROBERT MARIE
BY
ATTORNEYS

INVENTOR.
ROBERT MARIE
BY
ATTORNEYS

Nov. 12, 1968 R. MARIE 3,410,361
VEHICLE SPEED CONTROL DEVICE
Filed Sept. 28, 1966 8 Sheets-Sheet 4

INVENTOR.
ROBERT MARIE
BY
ATTORNEYS

Nov. 12, 1968  R. MARIE  3,410,361
VEHICLE SPEED CONTROL DEVICE
Filed Sept. 28, 1966  8 Sheets-Sheet 5

INVENTOR.
ROBERT MARIE
BY
ATTORNEYS

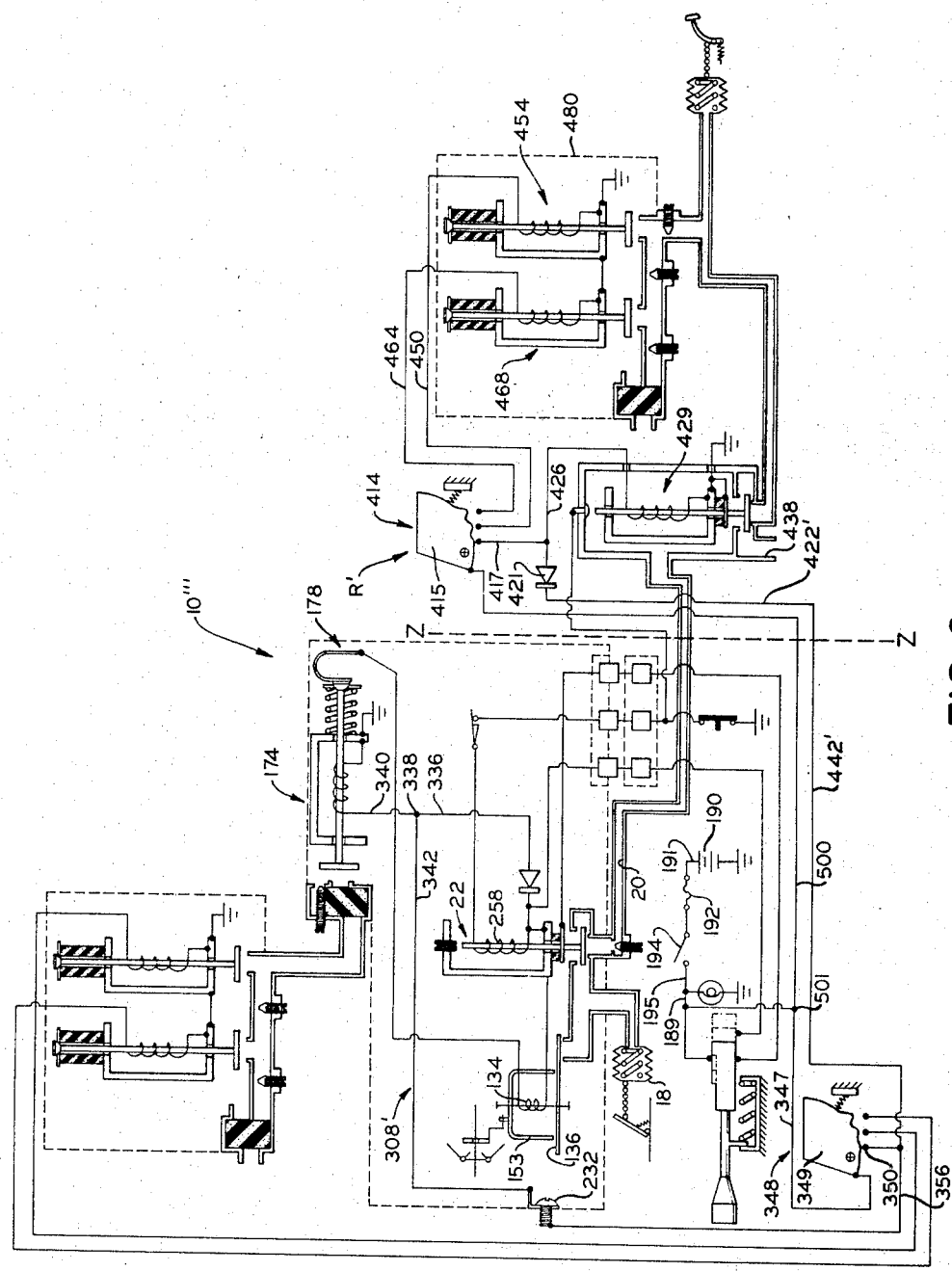

United States Patent Office 3,410,361
Patented Nov. 12, 1968

3,410,361
VEHICLE SPEED CONTROL DEVICE
Robert Marie, Hagerstown, Ind., assignor to Dana Corporation, Toledo, Ohio, a corporation of Virginia
Filed Sept. 28, 1966, Ser. No. 582,629
33 Claims. (Cl. 180—108)

ABSTRACT OF THE DISCLOSURE

A speed control unit is provided comprising an electro-mechanical device that utilizes manifold vacuum, as modulated by atmospheric pressure to control an engine throttle and thereby maintain a vehicle at a desired speed. The speed control unit includes an electro-hydraulic arrangement so that the speed of the vehicle may be advanced or retarded with the new speed reached automatically maintained by the speed control unit.

---

This invention relates generally to speed control devices and more particularly to an improved speed control device providing extremely close control of a vehicle's speed by an electro-fluidic means.

Although prior speed control devices have been designed which utilize fluidic means, such as engine manifold pressure modified by atmospheric pressure, as a source to control throttle setting, no such prior devices are known which provide the combined functions of positive manual speed setting, positive switch actuated throttle advance and positive switch actuated throttle retard through the use of a three-position selection switch conveniently located in the passenger compartment mounted, for example, on the turn signal indicator, dashboard or the like. Further, no such device is known which accomplishes these three functions through a simplified vacuum and electrical circuit that is compact, reliable, easily manufactured, durable and low in cost.

It is, therefore, an object of this invention to provide a speed control device having both manual and automatic speed setting.

It is an additional object of this invention to provide a speed control device that, through switch means, advances or retards vehicle throttle.

It is an additional object of this invention to provide a proportioning advance and/or retard for the vehicle so that differing rates of acceleration and/or deceleration may be obtained.

It is a further object of this invention to provide a speed control device wherein locking in of a desired vehicle speed can be obtained by actuation of a manual means.

It is a still further object of this invention to provide a speed control device which is durable in operation, easily and inexpensively manufactured.

In one embodiment of the invention, an electro-mechanical device is provided that utilizes manifold vacuum as modulated by atmosphere pressure to control the engine throttle and thereby maintains the vehicle at a desired speed. The three basic components of the device are a regulator means, a servo means, and an electrical circuit and control switch. The regulator means senses speed through a speedometer cable or cable attached to the transmission or the like and feeds vacuum pressure modulated by atmospheric pressure to the servo which controls the throttle setting. The regulator means includes a solenoid valve means that opens or closes to permit the application of vacuum pressure to the servo, which, in the instant device takes the form of a bellows. A modulating valve is also supplied as a portion of the regulator means which controls the bleed of atmospheric pressure to the servo means, with the modulating valve adjusted by a coupling coil through a fly-ball governor that senses vehicle speed. The electrical circuit includes means for actuating the solenoid valve and coupling coil so that the device can be locked in at the desired control speed and also includes means for deactivating the solenoid valve and coupling coil so that the vehicle speed is retarded. Additional means are also provided in the form of a solenoid valve capable of closing off the atmospheric air supply to advance the throttle and thereby the speed of the vehicle.

In an additional refinement of the invention, a modulated throttle advance means is incorporated in the described device so that a speed regulating mechanism is provided having manual speed setting, automatic throttle retard and modulated throttle advance.

In a further refinement of the invention a modulated throttle retard means is incorporated in the described device so that a speed regulating mechanism furnishing manual speed setting, automatic advance and modulated throttle retard is provided.

In a still further refinement of the invention, a combination of modulated retard and modulated advance is provided so that manual speed setting, modulated retard and modulated advance of the throttle setting may be obtained.

Other objects and advantages of this invention will be readily apparent from a reading of the following description and a consideration of the related drawings wherein:

FIG. 9 is a schematic illustration similar to FIG. 6 of a speed control device having modulated retard and advance.

Figure 6:
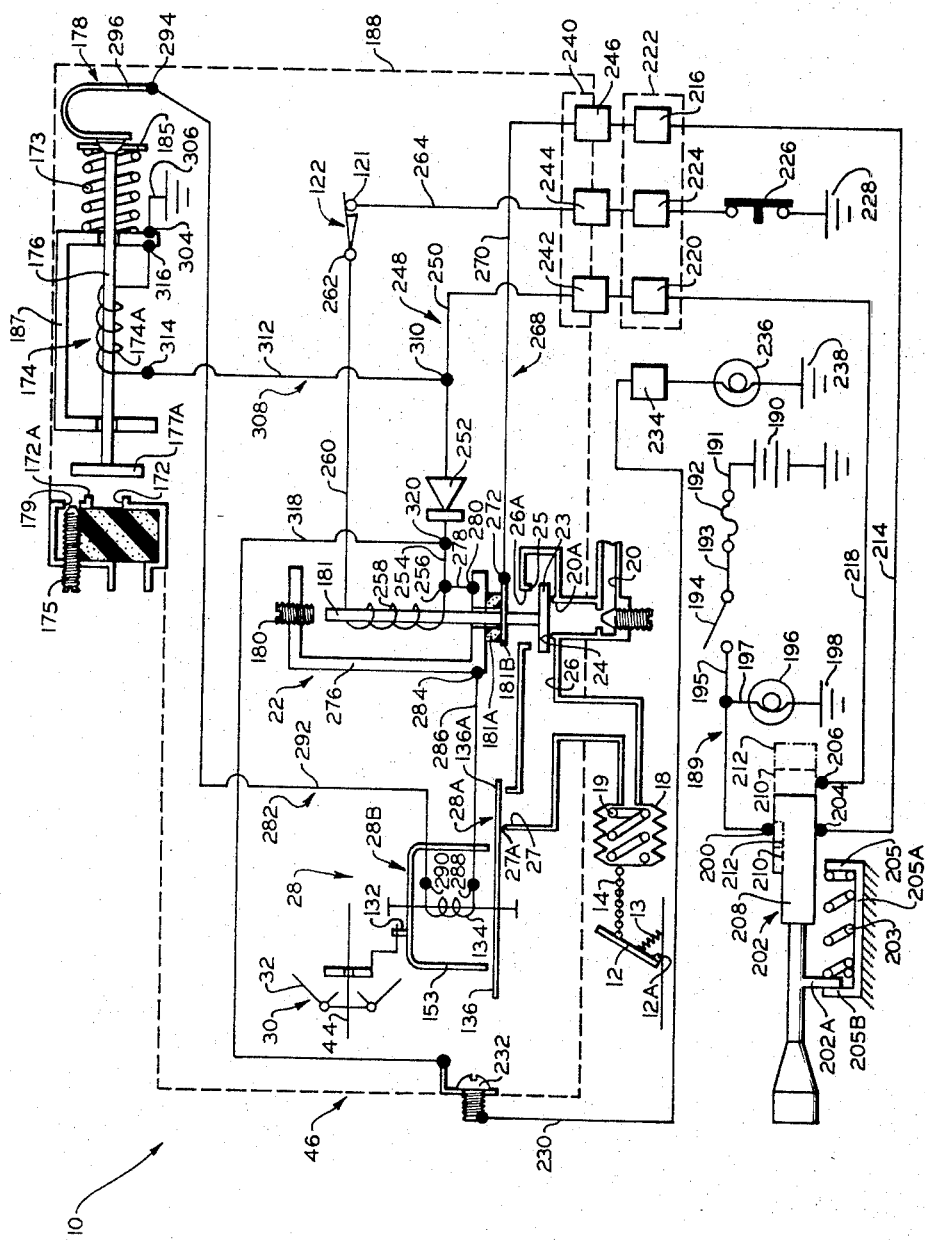
FIG. 6 is a schematic illustration of the speed control system incorporating the regulator of FIG. 1 with certain parts fragmentarily shown and certain parts in section.

A speed regulator system 10, embodying the instant invention is schematically illustrated in FIG. 6, and is preferably installed in a vehicle to control the engine through a throttle lever 12 and any suitable one-way linkage, such as a bead chain 14, connecting the throttle lever 12 to a servo motor in the form of a bellows 18 of the speed regulator system 10. The lever 12 is mounted at its lower end on a pivot 12A and connected by suitable linkage to the carburetor of the engine (not shown) such that clockwise movement of the lever advances the carburetor setting while counterclockwise movement thereof retards such setting; the throttle lever being biased counterclockwise by a spring 13 to its maximum retard or idle position. The chain 14, upon collapse of the bellows 18, pulls the lever 12 advancingly clockwise against the bias of the spring 13, while the lever, because of the one-way effect of the chain, may advance clockwise beyond the position dictated by the bellows in response to other forces, such as the operator of the vehicle manipulating the gas pedal.

A supply line 20 is adapted to be connected to a suitable fluidic source. In the embodiments shown herein the fluidic source is contemplated as being a supply of negative pressure such as the intake manifold of an internal combustion engine (not shown) and the components of the system 10 are adapted for vacuum utilization; it being understood that other fluidic types can be utilized with suitable modification of the components of the system 10. A second supply line 26 is connected to the supply line 20 at a port 20A, with the supply line 26 confluently connected to the bellows 18. Thus, upon vacuum being supplied to the bellows 18 through the supply lines 20 and 26, the bellows will collapse thereby pulling the chain 14 to the right.

The supply line 26 is provided with a port 26A aligned with the port 20A, which port 26A is adapted to admit atmospheric pressure to the line 26. The ports 20A and 26A are respectively provided with valve seats 24 and 25 and a plunger 23 of a solenoid valve 22 is disposed in the supply line 26 and adapted to move alternately to positions wherein it engages the seat 24 or the seat 25. When the plunger 23 engages the seat 25, vacuum or negative pressure is supplied from the supply line 20 through the port 20A and to the supply line 26 and, through the latter, to the bellows 18; the plunger 23 being seated upon the valve seat 25 and preventing the admission of atmospheric pressure through the port 26A to the supply line 26 at this time. When the plunger is seated against the valve seat 24, negative pressure in the line 20 is blocked from the line 26 and, since the port 26A is open at this time, atmospheric pressure is supplied therethrough to the line 26 and through the latter to the bellows 18. The bellows 18 may be provided with a return spring 19 which returns the bellows to its expanded condition upon the supply thereto of atmospheric pressure, so that the bellows no longer pulls the bead chain 14 to the right. Alternately, the spring 19 may be omitted and the spring 13 utilized to expand the bellows by means of the connection of the spring 13 with the bellows through the lever 12 and chain 14.

The supply line 26 is provided with a port 27 which is adapted to bleed air from the atmosphere into the supply line 26, and a regulator means 28 is adapted to modulatingly control the flow of air from the atmosphere into the supply line 26 through the port 27. The regulator means 28, when activated, is responsive to vehicle velocity in modulating the supply of atmospheric pressure to the supply line 26 to thereby maintain the bellows 18 and the lever 12 in proper position for desired speed maintainance.

The regulator means 28 (FIGS. 1-4) includes a flyball governor 30 including a pair of opposed weights 32, 32 with each of the weights having an arm 33 extending inwardly from a corner thereof to give each of the weights and attached arm a general L-shape in side view. Each of the weights 32 is attached to a collar bracket 34 by a pivot pin 36 mounted in the collar bracket. The collar bracket is generally U-shaped in configuration (FIG. 2) with each of the spacedly displaced legs 38 of the collar bracket mounting the pivot pins 36 so that the pins extend therebetween, with the pivot pins 36 spaced sufficiently far from a bight 40 of the collar bracket 34 so that the weights 32, 32 mounted thereon are free to pivot inwardly beyond an axially parallel position before there is engaging interference of the arm 33 of the weight with the bight 40 of the collar bracket. The collar bracket 34 also includes radially inturned portions 42 at the outer ends of the legs 38 which, by engaging the arm 33, limit outward pivoting movement of the weights 32.

The governor 30 includes a shaft 44 on which is mounted the bracket 34 and which extends longitudinally within a regulator housing 46, with the shaft 44 journalled therein by a pair of bushings 48 and 50 disposed at its opposite ends. The bushings 48 and 50, in turn, are fixedly disposed in the housing by being press-fit in a pair of bores 52, 54 formed, respectively, in the housing 46 and an end cap 110 fixed thereto.

Provision is made to fixedly connect the collar bracket 34 to the shaft 44 so that there is no relative rotational or longitudinal movement therebetween which includes a washer 56 locked to the shaft and disposed against the rightward face of the bight portion 40 of collar bracket 34 and a Belleville washer 58 disposed against the leftward face of the bight portion 40 and held thereagainst by a spacer washer 60 and washer 62 locked to the shaft. It should be noted that the shaft 44 and thereby the fly-ball governor 30 will be urged to move by reaction forces aixally rightward relative to the housing 46 so that a thrust bearing means 64 comprising a pair of spacer washers 66, 68 disposed on opposite sides of a bearing ring 70 are provided so as to permit the fly-ball governor to easily rotate with the shaft 44 without the imposition of large friction forces.

The thrust bearing means 64 is mounted within a gear 72 which may preferably be made of plastic such as nylon or the like since only small loads are transmitted thereby. A counter-bore 78 in the gear 72 receives the bearing means 64. The axial extent of the bore 78 is less than the combined linear dimensions of the spacer washers 66, 68 and the bearing ring 70 so that the rightward washer 68, upon rightward axial shifting of the shaft 44 abuttingly bears against the bushing 48 so that the side face of gear 72 is not subject to rubbing contact with the housing 46 or bushing 48. The gear 72 is provided with a counterbore 74 in its leftward portion to receive the retaining washer 56, with the bore 74 spaced from the bore 78 by an annular web 76 that seats against the washer 66.

Extending leftwardly from the gear 72 is a tang 73 which engages in an aperture 75 in the collar bracket 34 to insure that there is no relative rotation between them so that they rotate unitarily with the shaft 44, the shaft 44 at its rightward end 45 providing a suitable connection for a speedometer cable (not shown).

Teeth 80, formed on the external periphery of gear 72, are in meshing contact with teeth 81 on a gear 82 which may also prefearably be made from a similar material as that utilized for gear 72. Gear 82 is fixedly mounted on a shaft 83 with the shaft 83 and gear 82 being limited in leftward axial movement by a pin 85 fixed to the housing 46. A bushing 84 press-fit in a bore 86 in the housing 46 supports the gear 82 and shaft 83 for rotational movement, the said movement being imparted to a cable or the like extending from the vehicular speedometer (not shown). Thus it can be easily seen that the shaft 83 provides a driven shaft and the shaft 44 the driving shaft for the speed regulator.

Disposed immediately leftwardly of the arms 33 on the weights 32 and mounted on the shaft 44 is a thrust bearing means 87 including a pair of spacer washers 88 and 90 between which is disposed a bearing ring 92. A spring guiding retainer 94, also preferably made of plastic, having a generally axially rightwardly extending hollow cylindrical portion 96 is also mounted around the shaft 44 and extends into the bore 97 of the spacer washer 88, 90 and bearing ring 92 to provide a mounting and alignment portion 95 for the thrust bearing means 87; the shaft 44 being freely rotatable within the retainer.

A series of radially outwardly extending ribs 99, integral with the spring guiding retainer 94, extend leftwardlyly from the mounting and alignment portion 95 with the said ribs extending axially along the remainder of the cylinderical portion 96 to serve as a strengthening means for the spring retaining cup. The rightward termination of the ribs 99 provide faces 103 against which the thrust bearing means 87 abuts. The rightward spacer washer 88 of the thrust bearing means abuts against a slightly rounded end 35 on each of the weight arms 33 so that, as the weights 32 pivot outwardly due to centrifugal force, the spring guiding retainer 94 is shifted axially leftwardly along the shaft 44 with the shaft attached weights 32 free to rotate relative to the spring guiding retainer 94 on bearing means 87. It should be understood that the arms 33 are displaced in a radial direction sufficiently removed from the shaft 44 so that no engagement occurs between the rightward end of the mounting and alignment portion 95 and the rounded end 35 of the arms.

The leftward end of the spring guiding retainer 94 includes a flared, hollowed out portion 98 forming a cuplike pocket 101 into which a resilient means 100 extends and seats. The resilient means 100 surrounds the shaft 44 and preferably takes the form of an axially extending coiled compression spring with the internal diameter thereof being sufficiently large so that coils of the spring do not interfere with rotation of the shaft 44. At the leftward end of the housing 46 a spring retaining collar 102 is mounted, the collar 102 being of generally hollow cylindrical shape so that the shaft 44 may extend therethrough. A tapered counterbore 104 in the retaining collar 102 receives the leftwardly extending end of the resilient means 100, this end of the resilient means seating on an annular flange 106 formed in the collar 102.

At the opposite end of the collar 102, a bore 108 is provided so as to receive a cylindrical shaped portion 109 of the end cap 110. A set screw 114 is threadingly received in retaining collar 102 and impinges on the portion 109 of the end cap to thereby fix the collar relative to the end cap. A plurality of screws 112 secure an end flange 113 of the cap portion 110 to the housing 46 so that the cap portion is fixed relative thereto and an inner end face 116 on the cap portion provides an abutting surface to limit axial shifting of the shaft 44 in a leftward direction.

Formed as an integral part of the spring guiding retainer 94 is a radially outwardly extending lug 118 (FIGS. 2 and 3) utilized as a convenient attachment for the means that actuates a low speed switch 122 which is mounted in fixed relation in the housing 46. An adjustment screw 120 is screwingly mounted in the lug 118 with its threaded shank portion 120A extending through the lug. The amount that the shank portion 120A extends to the right of the lug may be screwingly adjusted so as to control the position of the end of the screw 120 (as controlled by the speed responsive position of the governor weights 32) relative to the low speed switch 122 and the low speed setting may be accurately adjusted. The switch 122 includes a stationary contact 121 and a movable contact 123 carried by a leaf spring 123A; the contact 121 and leaf spring 123A being insulatingly carried by the housing 46. It should be understood that the switch 122 is a normally closed limit switch which is held open by the screw 120 at speeds below the adjusted low speed, that is, below the adjusted low speed the screw 120 is in engagement with the leaf spring 123A and biases the upper portion of the same to the right to space the contact 123 to the right of the contact 121, and that leftward shifting of the spring retaining cup 94 moves the screw 120 to the left and away from contact with the resilient leaf spring 123A when speed above the adjusted low speed is reached and permits the spring 123A to bring the contact 123 into engagement with contact 121 and thereby close the switch 122. The adjustment screw 120 may be set to permit closing of switch 122 at any desired speed but normally a vehicle speed of 25–30 miles per hour is considered most desirable.

An attaching lug 124 (FIGS. 1 and 3) is also formed as a part of the spring guiding retainer 94 and is displaced 90° from the lug 118 and extends radially downwardly from the flanged portion 98. At link 125 is attached to the lug 124 through an integral right angled portion 126 on the link by riveting or the like, and the link 125 extends axially leftwardly and parallel to shaft 44 so that the link moves axially with the spring guiding retainer 94. A slot 129, disposed in the link 125, extends linearly in the axial direction along the link 125 for the reception of a pin 132 extending therein so that the pin 132 may slide relative to the length of the link 125. A slider member 130, mounted on the link 125, also recieves the pin 132 through an aperture 133 disposed therein. Slider member 130 is generally U-shaped in cross-section with two extending legs 137 and 139 disposed against opposite upper and lower faces of the link 125 and the bight portion 141 of the slider member is disposed against the edge of the link 125. Slider member 130 also includes an upturned portion 143 formed on the lower leg 139 which slightly overlaps an upturned angled portion 131 extending linearly in an axial direction along the link 125. The pin 132 is thereby mounted in and guided in its sliding movement along link 125 by the slider member 130.

The link 125 also includes at its leftward end, another right angled portion 128 having a slot 135 disposed therein for connection to the end of a coiled tension spring 145. The spring 145 is conveniently hooked through slot 135 and extends rightwardly therefrom and is hooked at its opposite end through a similar slot 149 disposed in a right angled portion 151 on the slider member 130. The spring 145 thereby urges the slider member 130 and the upwardly extending pin 132 leftwardly with it, this leftward movement being limited by the abutment of the leg 137 of the slider member with the right angled portion 128 of the link 125. Accordingly, the spring 145 yieldingly connects the link 125 to the pin 132 and allows the link to leftwardly overtravel the pin 132 if required for manual override by the accelerator pedal.

Figure 1:
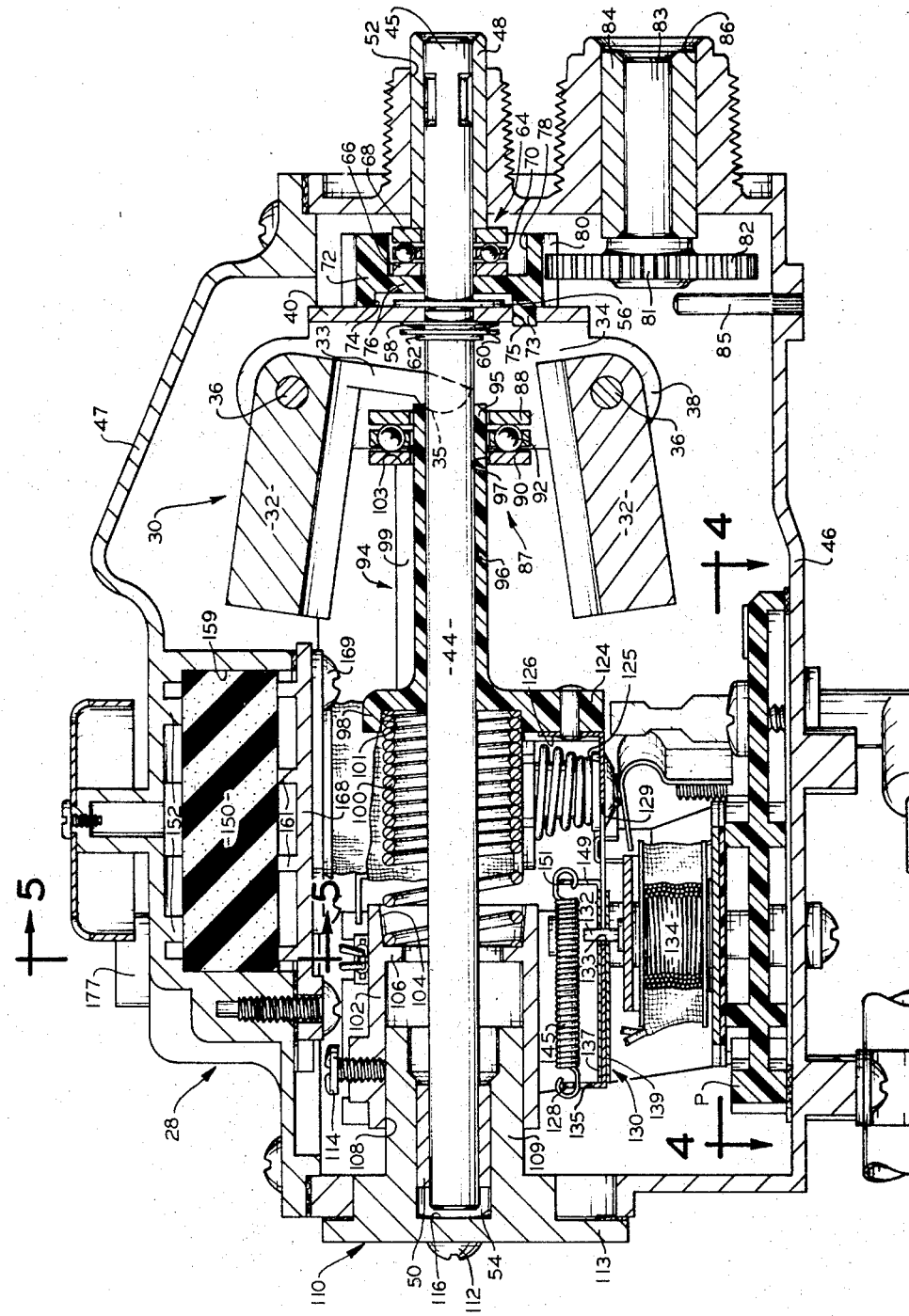
FIG. 1 is a side view in cross-section of a speed regulator incorporating this invention.
Figure 2:
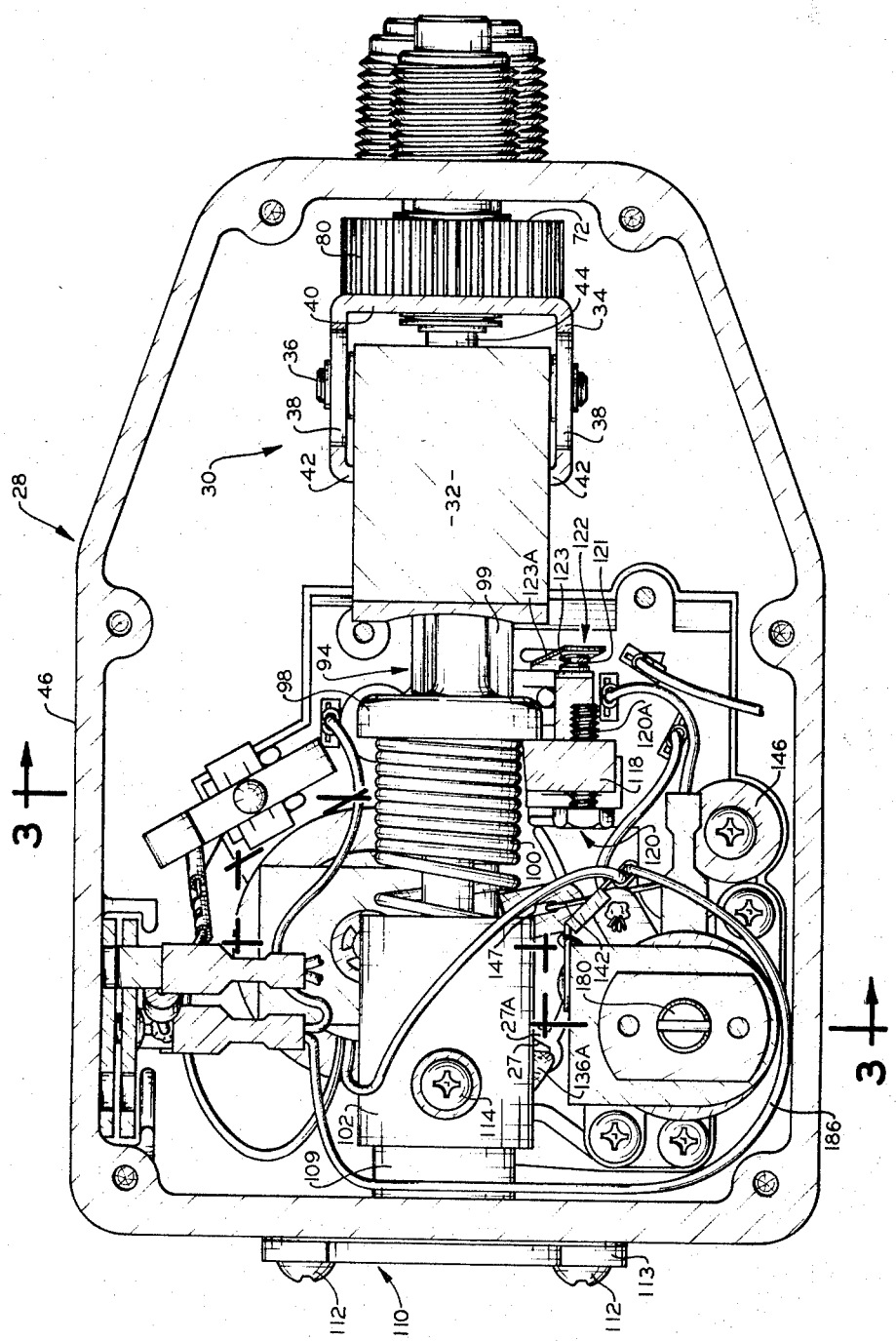
FIG. 2 is a plan view of the regulator of FIG. 1 with the housing cover removed.

The regulator means 28 also includes a modulating valve means shown generally at 28A and a controllable coupling means shown generally at 28B, the latter being provided for coupling the fly ball governor 30 to the modulating valve means. More particularly, a plastic housing P is suitably secured, as by a plurality of bolts, to the inside of the bottom wall of the housing 46, adjacent the left end thereof as seen in FIG. 1. As viewed in FIG. 3, in the right hand portion of the plastic housing P are formed portions of the supply lines 20 and 26, while other portions of the supply lines, respectively, are provided in tubes 20T and 26T pressed into the housing 46 and confluent with the portions of the supply lines in the plastic portion. The port 27, which is adapted to bleed modulating atmospheric pressure into the line 26, is provided with a valve seat 27A and, to the left of the valve seat, the plastic housing has formed thereon an annular shoulder, the upper surface thereof forming a bearing surface B upon which rests a valve plate 136; the latter being hereinafter more fully described. Projecting upwardly from the housing P and formed integrally therewith is a pivot post 138 disposed centrally with respect to the bearing surface B.

Figure 3:
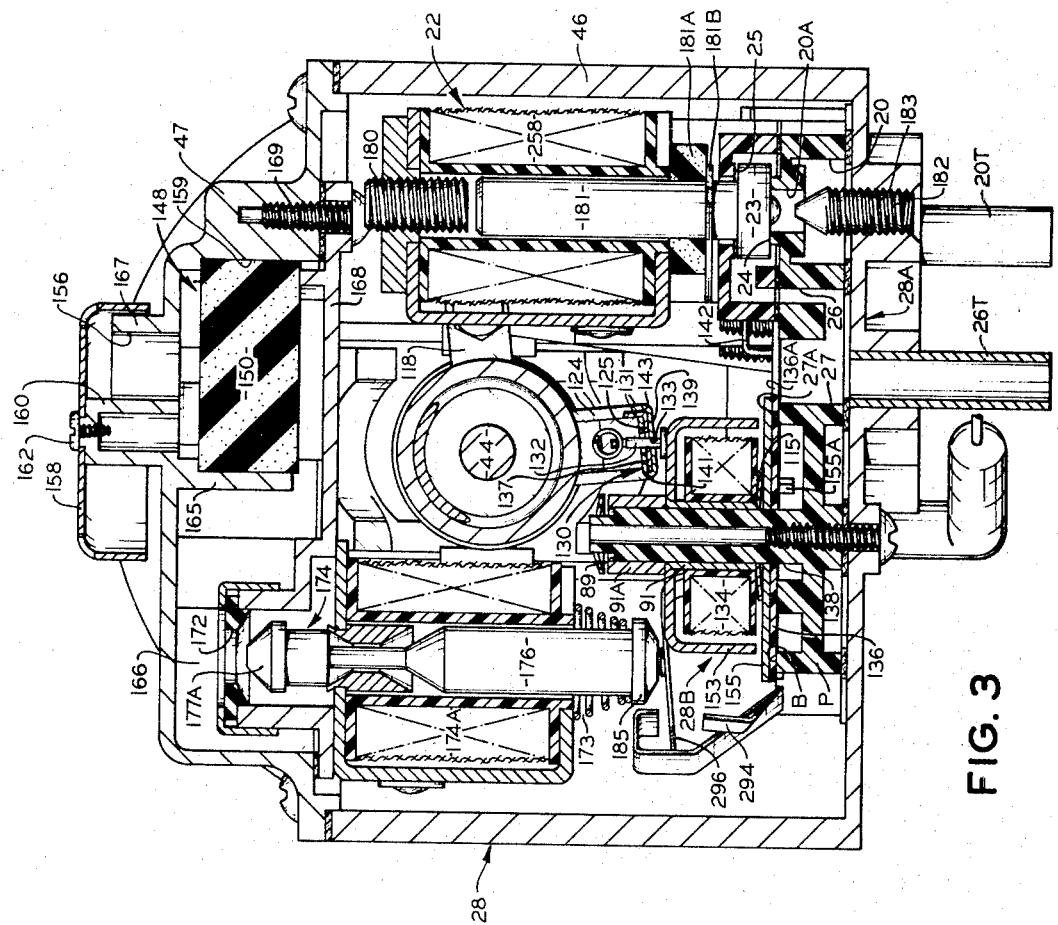
FIG. 3 is a cross-sectional view of the regulator shown in FIG. 1 when viewed generally on the line 3—3 of FIG. 2.

The coupling means 28B includes a metallic bracket 153 having a general U-shaped cross-section when viewed in FIG. 3, which bracket has centrally fixedly secured thereto a downwardly extending cylindrical bushing 91 pivotally received on the post 138. As seen in FIG. 3, the right hand portion of the bracket 153 is disposed generally beneath the link 125 and has fixedly mounted thereon the pin 132 at a position which is eccentric with respect to the post 138, whereby axial movement of the link 125, through the cooperation of the pin 132, induces a corresponding rotation of the bracket 153. A bushing 91A surrounds the pivot post 138 and is disposed abuttingly above the bracket 153 and a washer 89 secured to the upper end of the post 138 is abutable with the bushing 91A to inhibit upward movement of the bracket 153. Mounted intermediate the bracket 153 and the valve plate 136 is a thin metallic plate 155, which plate is secured to the valve plate 136 by lug means 155A formed on the metallic plate and projecting through registering openings in the valve plate. The valve plate is preferably formed from plastic that is freely slidable on the bearing surface B. A relatively weak Belleville spring washer 115 is disposed between the bushing 91 and the metallic plate 155 with its external periphery engaging the plate and the top surface thereof engaging the bushing 91 to thereby normally resiliently displace the bushing and bracket 153 vertically above the metallic plate 155, whereby the metallic plate 155 and valve plate 136 may rotate as a unit independently of the bracket 153.

A cylindrical coupling coil 134 is rotatably disposed about the pivot post 138 and disposed within the bracket 153. The coupling coil 134, upon being energized, is capable of magnetically locking the metallic bracket 153 and the metallic plate 155 so that upon turning movement of the bracket 153, when the coil is energized, the valve plate 136 will turn unitarily therewith.

Figure 4:
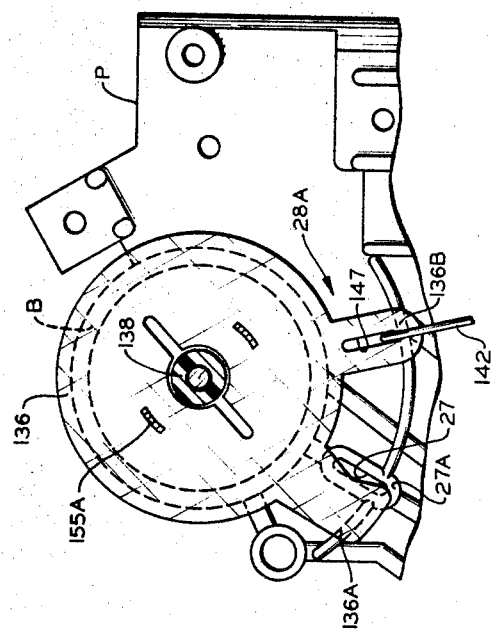
FIG. 4 is a fragmentary plan view of the modulating valve when viewed generally along the line 4—4 in FIG. 1.

A pair of lugs 136 A and 136B, best seen in FIG. 4, extend from the valve plate 136. The lug 136A is positioned so as to be cooperative with the valve seat 27A, that is, the bottom surface of the lug 136A is engageable with the valve seat. Upon rotation of the valve plate 136, the lug 136A is operable to slide on the seat 27A and, depending upon the lug's position, covers, uncovers or partially covers the port 27.

An elongated centering spring 142, made of a thin resilient wire has the reaction end thereof connected to a pin 146 (see FIG. 2) fixed relative to the housing, while the opposite end of the spring is bent vertically downwardly and passes through a slot 147 formed in the lug 136B. As seen in FIG. 4, the centering spring 142 is adjusted so that when the coil 134 is not energized, the spring will position the valve plate 136 such that the right side of the lug 136A, which is V-notched, partially overlies the port 27. The V slot is provided so that, upon movement of the lug 136A relative to the port 27, a gradual change in the opening of the port will occur. The exact centralized position of the lug 136A may be adjusted by adjusting the spring 142 and it is preferred that the port 27 be partially open when the coil 134 is not energized. Accordingly, when the coil 134 is energized to couple the governor 30 to the valve plate 136, the modulating means 28A will be in a partial modulating condition, that is, not full on or full off and, thus, only a minor modulation change can occur upon energization of the coil.

Figure 5:
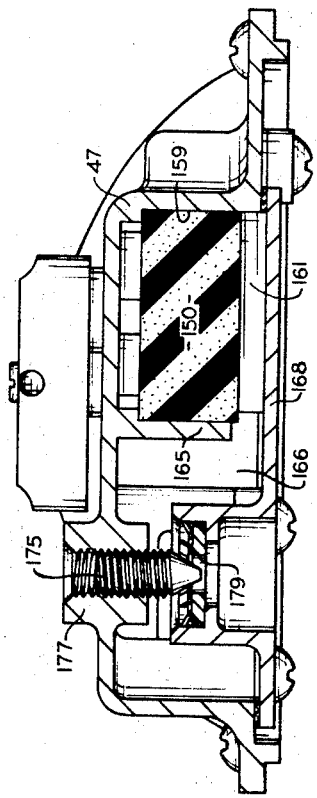
FIG. 5 is a cross-sectional view of the speed regulator when viewed along the line 5—5 of FIG. 1 and showing the bleed valve arrangement.

A filtering means 148 is disposed in the cover portion 47 of housing 46 (FIGS. 3 and 5) to clean the air flowing into the housing for supplying the valve means 28A with atmospheric pressure. The filtering means 148 comprises a filter element 150, which is a block of foamed polyurethane or the like, mounted in a space 159 formed in cover 47 and sandwiched between two sets of ribs 152 and 161 (FIG. 1). The ribs 152 are integral with the cover and the ribs 161 are integral with a plate member 168 secured to the bottom side of cover 47 by screws 169, so that the ribs serve as a spacing means for the filter element 150 to provide an air space above and below it. A port 156 (FIG. 3) disposed immediately above the filter element 150 and confluent with the space 159 is formed in a boss 167 integral with the housing 46. This port connects directly with the atmosphere and leads down and opens above and centrally relative to the filter element 150 and thus serves as a modulating fluidic source. A generally cup-shaped element 158 is mounted on a boss 160 also formed integral with the housing 46 and is fixed thereto by a screw means 162. The cup shaped element 158, with its periphery spaced slightly over the cover 47, extends over port 156 and protects the same from the intrusion of dirt into the housing.

After air passes through the filter 150, it flows into a compartment 166 (see FIG. 5) separated from the remainder of the space 159 by a wall 165 extending downwardly but not engaging the plate member 168. Within the compartment 166 is a port 172 (FIG. 3) communicating with the inside of the housing 46. An advance solenoid valve 174 is disposed beneath this port so that a conical plunger 177A carried by an armature 176 of the solenoid valve may alternately open and close the port 172. Accordingly, the advance solenoid valve 174 is a part of the regulator means 28.

A bleed adjusting screw 175 (FIG. 5) threadedly mounted in a boss 177 in cover 47 and extending into an orifice 179 in the plate member 168 permits a limited bleeding of air through the compartment 166 and into the housing 46 at all times so that actuation of the advance solenoid valve 174 to the closed position does not completely deprive the housing of its air supply and thereby vary the speed of the vehicle too rapidly, as hereinafter more fully described.

Actuation of the solenoid valve 174 so that it moves upwardly to cover the port 172 operates to open a normally closed limit switch 178 comprised of an armature 176 of the valve 174 and a switch blade 296; the armature being normally biased into engagement with the blade 296 by a spring 173, while the blade is insulatingly carried by the housing 46.

The solenoid valve 22 that controls the flow of vacuum to supply line 26 is provided with an adjustable screw 180 (FIGS. 2 and 3) disposed above it which determines the length of upward travel of the solenoid armature 181 in opening and closing against the valve seat 25. The adjustment screw 180 also serves as a contact point for the flow of electrical current in the control circuitry which will be later described. A restricter element 182, which is mounted in the housing below the solenoid valve 22 (FIG. 3), is disposed in the vacuum supply 20 such that the end thereof cooperates with the port 20A to provide an orifice, and is provided with threads 183 so as to adjust inwardly and outwardly to alternately decrease or increase the flow of negative pressure supplied to solenoid valve 22.

Wiring generally indicated by number 186 is also provided in the housing 46 to electrically connect the various elements already described and to form the control circuitry for the speed regulator system 10.

Referring to FIG. 6 wherein the entire speed regulator system 10 is shown schematically, the dashed rectangular outline denoted 188 indicates the enclosure formed by the shell of the housing 46 and cover 47 and illustrates, by outlining within its boundaries, the actuating and control elements disposed within the housing.

Conveniently mounted in the vehicle outwardly of the housing is a power supply circuit 189 that includes a power supply such as a grounded battery 190. A lead 191 attached to the battery extends to a fuse 192 which, in turn, is attached to an on-off switch 194 by a lead 193. A lead 195 attached to the other contact of the switch 194 leads to a contact 200 of a three position switch 202. Disposed between the contact 200 and the on-off switch 194 and connected to the lead 195, is a lead 197 having, in circuit with it, an on-off signal light 196 that is grounded at 198. The light 196 may be conveniently mounted on the dashboard and is utilized to indicate when the power supply circuit 189 is in operative condition (switch 194 is closed). Contact 200 is positioned so that an electrical path may be established through it by a three-position switch 202. Contacts 204 and 206 provide the other contact elements for this three-position switch.

When switch 202 is in its normal position indicated in full lines and denoted 208 in FIG. 6, contacts 200 and 204 are contacted by the switch 202 and an electrical path established between them. When the switch 202 is depressed midway to its intermediate position, indicated by dotted lines 210 in FIG. 6, contacts 200, 204, and 206 are placed in electrical conducting relation. When the three-position switch 202 is in its fully depressed position (indicated by chain dotted lines 212), contacts 204 and 206 are engaged by switch 202 and contact 200 is open. The switch 202 includes a flange 202A against which is abutted the left end of a compression spring 203, while the right end of the spring abuts a shoulder 205 carried by a member 205A fixed stationarily relative to the switch. The spring 203 normally biases the left side of flange 202A against a shoulder 205B, to normally maintain the switch 202 in its full line position shown at 208.

Contact 204 is connected to lead 214 which extends into a terminal 216. Contact 206 is connected to the lead 218 which extends into a terminal 220. The terminals 216 and 220 are disposed in a terminal block 222 which also includes terminal 224 connected to a switch 226 which is actuated by engagement of a vehicle brake (not shown) to an open position. The switch 226 is normally closed when the brake is not actuated so as to provide an electrical path through the terminal 224 to ground indicated at 228.

Also mounted outside of the speed regulator housing 46 is a lead 230 which is attached to a screw terminal 232 insulated from and extending through housing 46. As its oposite end the lead 230 is provided with a terminal 234 into which is plugged a signal light 236 that is grounded at 238. It should be apparent that terminal block 222 and lead 230 and terminal 234 provide for easy connection between those electrical components located outwardly of the housing 46 and those electrical components located within the housing 46. It should also be understood that the several leads 214, 218, and 230 can be combined into one cable, if desired, and the said cable led into the engine compartment for electrical attachment to the housing 46. Mounted within the dashed outline 188, indicating the housing 46, is a second terminal block 240 having terminals 242, 244, and 246 which are easily connected to the terminals 220, 224, and 216, respectively, for example, by making the terminals 242, 244, and 246 male plug elements communicating with the exterior of the housing and terminals 220, 224, and 216 mating female socket elements.

A vacuum solenoid actuating circuit 248 includes the contact 206, lead 218 and terminals 220 and 242 and also includes within the housing 46 a lead 250 connected to the terminal 242 on terminal block 240 and extending within housing 46 for connection to a silicon diode 252 acting as a one-way valve (the purpose of which will be described later). The circuit 248 also includes a lead 254 connected to the oposite terminal of the silicon diode 252 extends to a junction 256 to which the solenoid coil 258 of solenoid valve 22 is coupled. Coil 258, at its upper end merges into a lead 260 which is connected, in turn, to a contact 262 on low speed switch 122. A lead 264 extends from the opposite contact 121 on low speed switch 122 to terminal 244 in terminal block 240 so that an electrical path is completed through the circuit 248 to ground.

Electrical actuation of the vacuum supply solenoid 22 occurs in the following manner. With the three-position switch 202 in its intermediate position 210 and the on-off switch 194 in power supply circuit 189 closed, current flows from the battery 190 through contact 200, switch 202 and contact 206. Current flow then follows lead 218 to terminal 220 thence to terminal 242 and then to lead 250. From lead 250, current flow is through silicon diode 252, lead 254 and junction 256. The solenoid valve 22 is actuated as current flows through solenoid coil 258, thereby moving an armature 181 of the solenoid upwardly until it abuts adjustment screw 180. The armature 181 carries the plunger 23 on the lower end thereof, and carries the plunger upwardly therewith from the seat 24 thereby permitting the flow of vacuum or negative pressure to supply line 26 from the vacuum supply line 20, while the plunger engages the shoulder 25 and prevents atmospheric pressure from reaching the line 26. Current from the solenoid coil 258 reaches ground through lead 260, low speed switch 122, lead 264, terminals 244 and 224 and closed brake switch 226. It should be noted that the armature 181 of the solenoid valve 22 is normally biased downwardly by an annular elastomeric spring 181A disposed between a frame 276 of the valve and a flange 181B secured to the armature so that the plunger 23 normally engages the seat 24 and is spaced from the seat 25 and the line 26 is, thus normally open to the atmosphere.

With the switch 202 in the intermediate position, current also flows from the junction 256 through a lead 278 to a contact 280 mounted on the solenoid frame 276. A lead formed by the conductive solenoid frame 276 provides a path of flow for current to a contact 284 mounted on the solenoid frame and from there through a lead 286 to a contact 288 attached to the coupling coil 134. Current then flows from a contact 290 attached to the other end of the coupling coil 134 through a lead 292 to a contact 294 on the blade 296 of decoupling switch 178. A path for current from the blade 296 to ground is provided through the armature 176 abutting the blade 296 to a conductive flange 185 connected to the armature and thence to a conductive spring 173 compressed between the flange 185 and a frame 187 of the solenoid 174. Current then flows from the frame 187 to ground through a contact 304 and a lead 306. Thus since the spring 173 normally biases the armature 176 against the blade 296, the coupling coil 134 is momentarily energized when the switch 202 is closed against contact 206, however, at this same time, with current in the leads 218 and 248 the advance solenoid 174 is actuated by current from a contact 310 in the circuit 248 through a lead 312 connected to the contact 310 and to a contact 314 on the coil 174A of advance solenoid 174. A path to ground is provided by a contact 316 of the coil 174A being attached to the solenoid frame 187 and through it to the contact 304 and the lead 306. Since actuation of the advance solenoid 174 moves the armature 176 leftwardly breaking contact with the switch blade 296 no flow of current can be maintained to energize the coupling coil 134 and its energization with the switch 202 in intermediate position is only momentary so that the valve plate 136 is only momentarily connected to the coupling means 28B.

A holding circuit indicated generally at 268 is also provided within housing 46 for supplying current to the solenoid 22 and coil 134 while not supplying current to the coil 174A of the advance solenoid 174 and comprises a lead 270 extending from terminal 246 to the conductive flange 181B on the solenoid armature 181 and joined thereto at junction 272. Current flows through the armature 181 and into a lead provided by a portion of the frame 276 and the adjusting screw 180, the armature 181 contacting the adjustment screw 180 (when the solenoid armature 181 is in its upper position). Current then flows into contact 280 connected to the solenoid frame 276 for connection to the lead 278 that is, in turn, connected to the solenoid coil 258 through a junction 256. The current from junction 256 cannot flow through lead 254 and then to the advance solenoid 174, through lead 312, since the diode 252 will prevent current flow in this direction.

Current flow through the holding circuit 268 moves to ground by an easily described path. With the contact 204 closed, current from power supply circuit 189 flows through lead 214, terminals 216 and 246, lead 270, contact 272, through the armature 181 and screw 180 to the solenoid frame 276 and thence to contact 280 and through lead 278 to the solenoid coil 258. The current from the solenoid coil 258 then flows to ground in the same manner as previously described for the solenoid actuating circuit 248, that is, current flows through lead 260, low speed switch 122, lead 264, terminals 244 and 224 and brake switch 226 to ground.

By the holding circuit just related, the solenoid 22, once it has been actuated into open upper position by the solenoid actuating circuit 248, wherein the armature 181 contacts the screw 180 and completes the holding circuit 268, is held in this position by the holding circuit 268 until contact with ground is broken by the opening of low speed switch 122 or brake switch 226 or until power supply is interrupted by movement of the switch 200.

A coupling coil circuit 282 which magnetically locks the coupling coil 134 to valve plate 136 is also provided. This circuit comprises the solenoid armature 181 which contacts adjusting screw 180 (when the solenoid armature is in its upper position) the solenoid frame 276 carrying the screw 180, a contact 284 on the solenoid frame 276 attached to the lead 286 which connects to the contact 288 connected to the coupling coil 134. The contact 290 on coupling coil 134 is connected to the lead 292 that extends to the contact 294 on blade 296 of limit switch 178. With the switch 178 in closed position, the switch blade 296 contacts the spring retainer 185 through the armature 176 of the advance solenoid valve 174. The retainer 185 is conductively connected to the frame 187 through the spring 173 and the frame 187 has a contact 304 for connection to the lead 306 going to ground. The urging spring 173, by reacting against the spring retainer 185, normally urges the armature 176 to the right and into engagement with the switch blade 296.

Current flow through coupling coil circuit 282 progresses through contact 204 and generally follows the holding circuit 268 to contact 272 and then through the solenoid armature 181 and frame 276 of the solenoid valve 22. After the holding circuit, the flow of current, serially, is then from a contact 284 on the frame 276 to the lead 286, the contact 288, the coupling coil 134, the contact 290, the lead 292 and the contact 294 on the blade 296 of the limit switch. From the blade 296, the current flows to the armature 176, the spring retainer 185, the spring 173 and to the frame 187, contact 304 on the frame, and finally to the lead 306 and to ground.

A circuit 308 for the advance solenoid 174 has already been described and is also provided within the housing 46. This circuit includes the contact 310 attached to lead 250 in the vacuum solenoid actuating circuit 248. The lead 312 extends from the contact 310 to the contact 314 attached to a solenoid coil 174A on the advance solenoid. At its other end the solenoid coil 174A is attached to a contact 316 which is connected to ground through lead 306.

The advance solenoid valve 174 is normally urged into open position by the urging spring 173 so that flow of atmospheric air through the port 172 is permitted without impediment. Upon actuation of the advance solenoid circuit the solenoid armature 176 is urged leftwardly so that a plunger 177A carried on the left end thereof abuts against a seat 172A at the aperture 172. Such action of the advance solenoid valve 174 limits the amount of atmospheric air entering the housing 46 to that bleeding through bleed screw port 179. However, the exterior of the housing and cover assembly 188 is, at this time, at atmospheric pressure with a constant bleed of atmospheric air being provided by orifice 179 thereby insuring that the throttle advance rate is not too rapid. Since the bleed screw 175 is threadedly adjustable a desired throttle advance rate may be obtained by opening or closing a portion of the orifice 179 by it so that the orifice and bleed screw provide a means for modulating the throttle advance rate of the vehicle.

Actuation of the advance solenoid 174 to closed position over the port 172 is provided by current flow through the advance solenoid circuit 308 from contact 310 in vacuum supply solenoid circuit 248 by passing through lead 312, contact 314, advance solenoid coil 174A, contacts 316 and 304 and lead 306 to ground.

A lead 318 connected to lead 250 by contact 320 extends to the contact 232 to complete the circuit for indicating light 236 which indicates when the vacuum solenoid 22 has been actuated to its upper position and thereby the vacuum from supply line 20 is being impressed on the neophrene bellows 18, the current for placing the light 236 in an on position being furnished through contact 320 from either the vacuum solenoid actuating circuit 248 or the holding circuit 268.

The previously referred to silicon diode 252 disposed in circuit 248 acts as a one-way valve to prevent actuation of the advance solenoid when the vacuum solenoid holding circuit 268 alone is being actuated (contact 206 open) so that current flow may not pass through diode 252 into lead 312. Thus feedback from circuit 268 is prevented and there is no uncontrolled advance of the throttle lever 12.

The over-all operation of the speed adjusting system 10, including manual speed set, speed advance, and speed retard will now be described. To manually set vehicle speed to the desired value, the foot throttle or gas pedal of the vehicle is actuated until a desired speed is reached, such speed must be above that set for low speed switch 122, closing switch 122 and readying the entire system for speed regulation. At the desired speed, switch 202 is momentarily depressed to its intermediate position (indicated by the dotted lines 210), closing contacts 200, 204 and 206, so that power is supplied to the vacuum solenoid actuating circuit 248 and advance solenoid circuit 308.

The armature 181 of the vacuum solenoid 22 is urged upwardly through the action of the circuit 248 thereby moving plunger 23 away from seat 24 and against seat 25 and providing negative pressure to the line 26 and through the latter to the bellows 18. At the same time, the upward movement of armature 181 which engages the screw 180 completes the holding circuit 268 thereby maintaining the armature 181 in the upper position and negative pressure on bellows 18. The actuated advance solenoid circuit 308 activates solenoid valve 174 into closed position against seat 172A so that only a small amount of modulating atmospheric air flows into housing 146 through bleed screw port 179. The movement of solenoid valve 174 to this position also prevents completion of the coupling circuit 282 and the magnetic locking of coupling coil 134 to valve plate 136 through movement of the armature 176 away from decoupling switch blade 296.

The momentary energization of contact 206 and thereby vacuum solenoid actuating circuit 248 and advance solenoid circuit 308 is interrupted by the release of switch 202 and movement thereof by spring 203 back to its normal position. Holding circuit 268 is still in an energized condition and current to circuit 308 is discontinued so that opening of solenoid 174 and contact of the armature 176 with decoupling switch blade 296 occurs and coupling circuit 282 is completed to ground through switch 178 and energizes the coupling coil 134 to couple the bracket 153 to the valve plate 136 so that any vehicular speed change will occasion movement of the plate 136. Upon the coupling of the bracket and plate 136, the vehicle was at the desired speed, and the lug 136A was centered over the port 27. Upon increase of vehicle speed over the set speed, the governor 30 will move the plate to open port 27 and, thus, admit more atmospheric pressure to line 26 and, in effect this atmospheric pressure modulates or overrules the vacuum in line 26 from supply line 20. With less vacuum in line 26, the bellows 18 will expand and the lever 12 will be moved counterclockwise by the spring 13 and retard the throttle setting. Upon decrease of the vehicle speed below the set speed, the governor 30 will rotate the plate 136 so that the lug 136A will cover the port 27 so that no atmospheric pressure may enter line 26 and the full negative pressure from supply line 20 will enter the bellows 18 to collapse the same thereby rotating the lever 12 clockwise to advance the throttle setting. It should be understood that the valve 28A does not have to operate as a full on or full off valve only, and that positions intermediate that where the lug 136A completely covers or uncovers the port 27 are attainable.

It is thus seen that momentary movement of the switch 202 from normal position to intermediate position and then back to normal position will lock in the speed at that at which the vehicle is operating. If the switch 202 is held in its intermediate position for a period of time longer than that required to actuate holding circuit 268, power will be supplied to advance solenoid circuit 308 for a sufficiently long time to actuate the advance function of the speed regulator. More specifically, the momentary energization of contact 206 provides a flow of current to advance solenoid actuating circuit 308 urging the advance solenoid 174 into a position which prevents flow of atmospheric air through port 172. Since the bleed adjusting screw 175 permits a limited supply of atmospheric air to housing 46, momentary actuation of the advance solenoid has an extremely limited effect on vehicle speed and manual lock in can occur at substantially the speed of vehicle travel. On the other hand, if contact 206 is closed for an extended period during manual speed set the closing of the advance solenoid 174 will limit the amount of atmospheric pressure to enter the housing 46. Therefore, even with the modulating valve 28B in open position, it cannot admit more than a minimum amount of atmospheric pressure into port 27 to modulate the vacuum in line 26 and almost full negative pressure will be supplied to bellows 18 to thereby actuate throttle lever 12 so as to actually increase speed.

Throttle advance may also be obtained after the system 10 has been placed in manual speed set condition. Switch 202 is depressed to its intermediate position wherein engagement with contact 206 provides current flow in advance solenoid actuating circuit 308. Solenoid 174 closes limiting the amount of modulating atmospheric air permitted entrance to housing 46 and opening coupling circuit 282, at which time spring 142 moves the valve plate 136 to its central position and the bracket 153 cannot manipulate the valve plate in response to actuation by the governor 30 since the coupling coil 134 is not connected to ground and thus, is not energized at this time. Accordingly, the increased speed signal from the governor 30 does not cause the bracket 153 to move the valve plate 136 to a corresponding "increased speed" position. Rather, the governor 30 merely moves the bracket 153 to a position corresponding to the increased speed while substantially full negative pressure is being supplied to bellows 18 advancing throttle lever 12 so that the vehicle accelerates. Upon reaching desired speed, switch 202 is permitted to return to its normal position opening the contact 206 thereby removing current from advance solenoid actuating circuit 308. Solenoid 174 opens permitting modulating air to again pass into housing 46 and the coupling circuit 282 to be completed through decoupling switch 296. Upon completion of coupling circuit 282, the coupling coil 134 immediately magnetically connects the valve plate 136 and bracket 153 and the governor 30 is again operable to move the plate 136 and thereby open and close the modulating valve 28a.

If it is desired to reduce vehicle speed from the speed set by the system 10 to thereby obtain throttle retard, the switch 202 is depressed to its full in position, indicated at 212, thus opening contact 200 relative to the switch 202 and removing power to the leads 214 and 218. This de-energizes the solenoid vacuum holding circuit 268 and the advance circuit 308 and permits vacuum solenoid plunger 23 to close against seat 24 and move away from seat 25 providing the flow of atmospheric air to supply line 26 through port 26a and blocking the supply of negative pressure to line 26 from line 20. Coupling circuit 282 is also de-energized so that coupling coil 134 does not magnetically lock the bracket 153 with the valve plate 136 and the plate is centralized over port 27 by spring 142 so that atmospheric air bleeds into the bellows 18 through both ports 26a and 27 and vehicle speed reduces by movement of the spring urged throttle lever 12. When the desired reduced speed has been reached, switch 202 is permitted to move outwardly through its intermediate position, energizing contacts 204 and 206, to its normal position energizing only contact 204. Such movement is sufficient to re-energize the contacts 204 and 206 to energize the holding circuit 268 with the contact 206 being energized only momentarily so that no advance occurs and the vehicle is locked in at the new speed.

Figure 7:
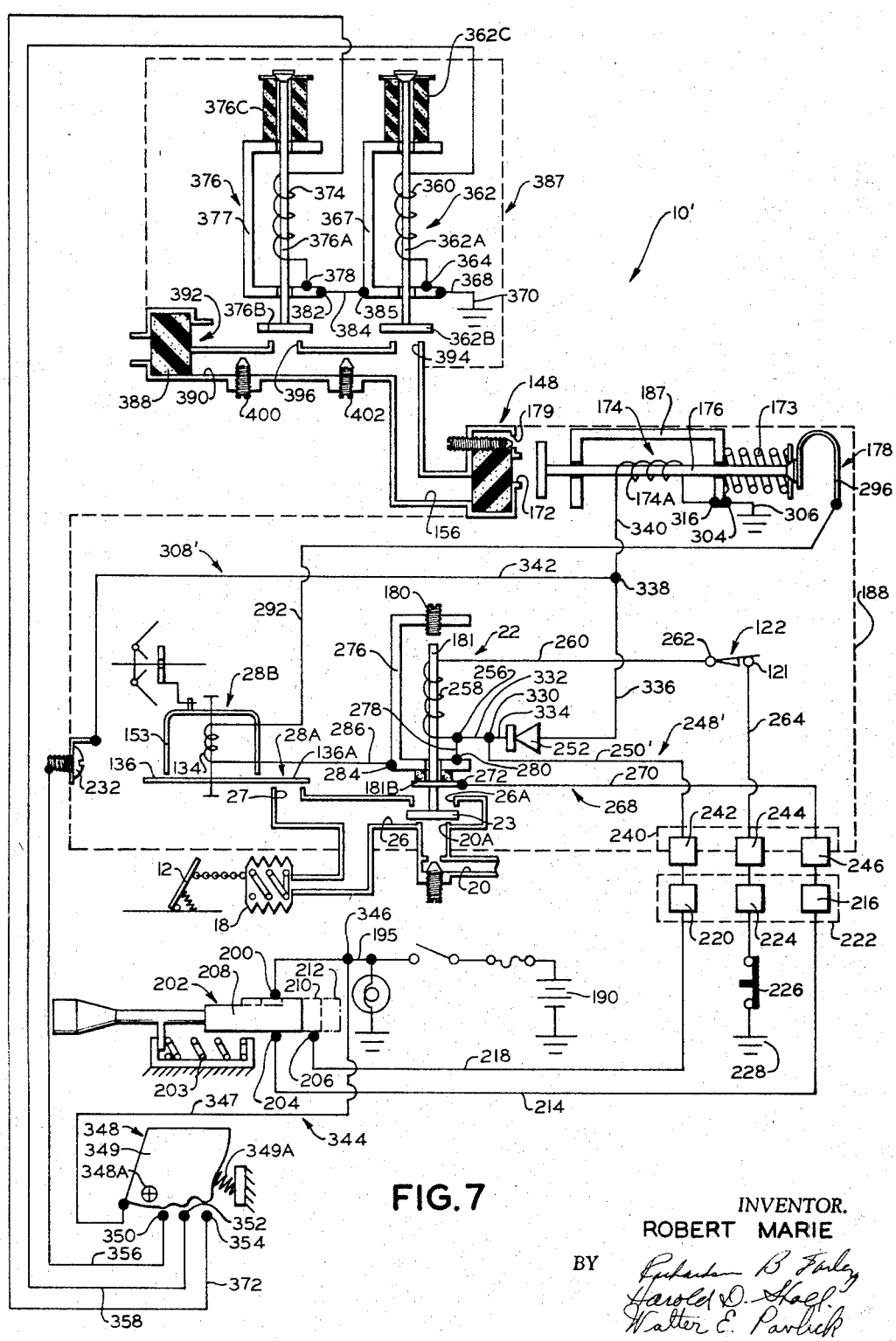
FIG. 7 is a schematic illustration similar to FIG. 6 but showing a speed control device having a modulated advance.

A modulated advance system 10' is illustrated in FIG. 7, which utilizes the same speed governor mechanism of FIGS. 1–5, and generally resembles, within the housing 46 (the dashed outline 188) the circuitry of the system illustrated in FIG. 6 except for two modifications therein. The lead in the vacuum solenoid actuating circuit 248' (FIG. 7) connected to the vacuum solenoid coil 258 and the lead from contact 232 that connects to the same actuating circuit have been reversed relative to the anti-advance silicon diode 252 as shown in FIG. 6.

More specifically, the vacuum actuating solenoid circuit 248' comprises a lead 250' extending from terminal 242 to a contact 330 disposed at the leftward non-current passing end of the silicon diode 252 with a lead 332 extending from the contact 330 to the contact 256. In this manner current flow in the vacuum actuating circuit 248' by-passes the one-way valve formed by silicon diode 252 rather than passing therethrough as in the system illustrated in FIG. 6. The remaining circuitry change within enclosure 188 comprises the use of a lead 334 extending rightwardly from contact 330 to diode 252, a lead 336 connected to the opposite side of diode 252 and extending to a contact 338, a lead 340 extending from the contact 338 to the advance solenoid coil 174A and a lead 342 extending from the contact 338 to the contact 232.

Outwardly of the enclosure 188, an additional power supply circuit 344 is provided. This circuit comprises a contact 346 connected to battery 190 which, as previously described, is attached to lead 195. The contact 346 is attached to lead 347 which goes to a three-position switch 348 that provides for modulated advance of the vehicle throttle. The switch 348 includes a pivotable contactor 349 which is biased upwardly to open position by a spring 349A but is capable of pivoting downwardly about a pivot 348A to thereby sequentially engage a series of first, second, and third contacts 350, 352, and 354, respectively. The lead 347 is connected to the contactor 349 of the switch 348, and a lead 356 extends from the first contact 350 and is attached to terminal 232 so as to complete an actuating circuit 308' for the solenoid valve 174 disposed within housing 46 and forming the first advance solenoid for the system 10'. A lead 358 extends from the second contact 352 to a solenoid coil 360 on a second advance solenoid 362. A contact 364 connects the solenoid coil 360 to a conductive 367 of the second advance solenoid 362. A contact 368 is also mounted on this portion of the frame 367 and is attached to ground through a connected lead 370.

The third contact 354 is attached to a lead 372 that extends to a solenoid coil 374 on a third advance solenoid 376. Solenoid coil 374, in turn, is connected to a contact 378 on a conductive frame 377 of the third advance solenoid 376. A contact 382 mounted on the frame 377 is attached to a lead 384 that extends to a contact 385 on the frame 367 of the second advance solenoid 362, which frame 367 provides an electrical path to contact 368 and therethrough via lead 370 to ground.

The second and third solenoids 362, 376 are displaced in a housing denoted by the dashed lines 387 and, respectively, have armatures 362A and 376A which have plungers 362B and 376B on the lower end thereof. Ingress for atmospheric air to this housing is by means of a filter 388, the air passing through this filter into a supply line 390 and also into the housing proper through a by-pass area 392 of the filter 388. A pair of ports 394 and 396 disposed below the plungers 362B and 376B on the armatures 362A and 376A, respectively, are closed by the actuation of these solenoids, the armatures 362A and 376A being normally biased upwardly by annular elastomeric springs 362C and 376C with the plungers spaced from the ports and the ports open to the atmosphere. The flow of air can thus be directed into the supply line 390 directly through the filter 388 and through the by-pass area 392, with the air flow from the by-pass area 392 passing through the ports 394 or 396 when open. When advance solenoid 362 is closed by-pass air flows only through port 396 and when both advance solenoids 362 and 376 are closed no by-pass air is provided. Downstream of the ports 394 and 396, the supply line 390 is sealingly attached to a port 156 leading to the second filter means 148.

A pair of bleed adjusting screws 400 and 402 are threadably adjustable so as to extend into supply line 390 and constrict the flow of air so that the advance rate provided by the described mechanism in the housing 387 may be further modified. More particularly, the screw 400 is disposed between the filter 388 and the port 396, while the screw 402 is disposed between the ports 396 and 394.

Manual locking in of the solenoid regulator system 10' is accomplished in a manner similar to that described for the system 10. The switch 202 is adjustable to its intermediate position shown in dotted lines at 210 so that the contacts 200, 204, and 206 are closed. Solenoid actuating valve 22 is thereby actuated through vacuum solenoid actuating circuit 248' to open port 20A and close port 26A and provide negative pressure from the supply line 20 to line 26 and then to the bellows 18. Current, in this instance, flowing from the contact 206, through lead 218, terminals 220, 242, lead 250', contact 330, lead 332 and thence to junction 256 to which the solenoid coil 258 is electrically connected. Lead 260, contact 262, low speed switch 122, lead 264, terminals 244 and 224 and brake switch 226 furnish a path for electrical flow to ground. Coupling coil 134 is also locked in at this same time by current flow through lead 278 connected to lead 286 by the conductive solenoid frame 276; ground for the coupling coil being furnished through decoupling switch 178 to contact 304 and lead 306.

With the vacuum solenoid 22 disposed in its upper position, the switch 202 may be moved to its normal position, indicated at 208 in contact with contacts 200 and 204 so that current flows from the contact 200 to the contact 204 through lead 214, terminals 216 and 246, lead 270, contact 272, the lead furnished by the armature 181, the adjusting screw 180, and the frame 276, then to the contact 280, lead 278 and thence to contact 256 which is connected to solenoid coil 258. An electrical path to ground is furnished in the same manner as for the circuit 248' so that solenoid 22 is held in its upper, open position by holding circuit 268 once actuated to this position by vacuum solenoid actuating circuit 248'.

The coupling coil 134 is also held in locked position at this same time through the adjusting screw 180, the lead furnished by the solenoid frame 276 and the contact 284 thereon that is attached to lead 286 which, in turn, is connected to the coupling coil 134. Lead 292 provides a path for current to flow to ground through the decoupling switch 178, the armature 176, the solenoid spring 173, the frame 187, the contact 304 and the lead 306.

It should be understood that actuation of vacuum solenoid actuating circuit 248' does not actuate advance solenoid 174 since the silicon diode 252 acts as a one-way valve preventing the flow of current into the lead 336 from lead 334 and that the non-activation of advance solenoid prevents breaking of the circuit to ground through lead 306.

To provide throttle retard actuation for the system 10', switch 202 is depressed to its full in position indicated at 212 thereby breaking from its contact 200 and removing power from the solenoid 22 and coupling coil 134, the solenoid plunger 23 moving downwardly sealing off port 20A and closing the supply line 20 and opening port 26A permitting the entrance of air into the supply line 26. At the same time the lug 136A of modulating valve 28B assumes a centered position over the port 27 also permitting the entrance of atmospheric air to the bellows 18. The spring urged throttle is moved to decelerating position and the vehicle's speed reduced. To lock in at a new reduced speed, the switch 202 is released, and in being moved to its normal position by spring 203, first passes into contact with contacts 200, 206 and 204, activating the vacuum solenoid 22 and coupling coil 134. It should be noted that the closing of the contacts 200 and 206 by the switch 202 does not automatically actuate the first advance solenoid 174 in the system 10' as it does in the system 10 since the contact 330 that is connected to the power source through contact 206 is disposed on the non-current conducting side of the silicon diode 252 and the contact 256 is similarly disposed and therefore current cannot pass into the lead 336 and from there to the advance solenoid 174.

Actuation of the first, second and third advance solenoids may only be accomplished sequentially through manipulation of the contactor 349 of the three-position modulating advance switch 348 (it being understood that this switch may also be conveniently mounted on the dashboard, turn indicator or the like). As the contactor 349 is pivoted clockwise, the contact 350 is first engaged providing a flow path for current through a lead 356 to the contact 232 mounted on the housing 46. A lead 342 extends from the contact 232 to a contact 338 on lead 340 and through the latter lead to the first advance solenoid coil 174A. A contact 316 mounted on the solenoid frame 187 is attached to the coil 174A and, with a contact 304, also mounted on the frame, provides an electrical path to ground through lead 306. The contact 338 also provides a flow of electrical current through lead 336 and silicon diode 252 and from there to solenoid coil 258 of vacuum supply solenoid 22 to provide actuation for this solenoid to place vacuum in supply line 26. At the same time, current cannot flow to coupling coil 134 since advance solenoid armature 176 has moved leftwardly breaking contact with decoupling switch blade 296. Thus, movement of switch 348 to contact 350 provides actuation that includes movement of first advance solenoid 174 to prevent the entrance of atmospheric air to housing 46 except through the bleed port 179, limiting the amount of modulating atmospheric air, and also actuation of vacuum solenoid 22 to provide negative pressure on the bellows 18 thereby advancing the throttle lever 12 and the vehicle speed. Since the coupling coil 134 is inactivated at this time, the valve plate 136 assumes a centered (partialy open) position over the port 27 and the air in the housing 46 may enter the line 26 through the port 27 to modulate the vacuum then present in line 26 and causing advancing movement of the bellows 18.

The purpose of lead 336 becomes apparent when it is observed that in the normal position of switch 202, the contact 206 is not engaged so that circuit 248' is open. Thus, upon depression of the contactor 349 to engage contact 350, with the switch in its position shown at 208 and with the vacuum solenoid 22 having not previously been placed in its upper position, the current flowing in circuit 308' that actuates the advance coil 174 will also actuate the vacuum solenoid coil 22 to its upper position wherein the armature 181 engages the screw 180 and completes the holding circuit which is then supplied through circuit 268; the latter circuit being supplied by current when the switch 202 is in its normal position shown in 208.

Accordingly, if the vehicle operator is proceeding at a speed which he is controlling by manipulating the foot throttle, he may energize the control system 10' by depressing the switch 202 and thereby proceed at the same speed, or he may depress the contactor 349 and advance speed to that desired and then merely release the contactor 349 and the system 10' will lock in at the advanced speed.

Depression of the modulated advance switch 348 in a further downward turning movement engages contact 352 simultaneously with the engagement of contact 350 to supply a flow of current through a lead 358 to actuate second advance solenoid 362 to closed position so that the flow of air through filter 388 passes only through supply line 390 and port 396 to supply line 390, but can no longer flow through port 394. Thus, the amount of air available in the housing 46 through the bleed port 179 is reduced so that port 27 can supply a lesser amount of air to modulate the advancing vacuum in supply line 26.

Further depression of switch 348 engages contact 354 simultaneously with the contacts 350 and 352 supplying a flow of electrical current through lead 372 to actuate advance solenoid coil 374 thereby urging the third advance solenoid 376 into a closed position over port 396 so that atmospheric air passes to supply 390 only directly from the filter 388 and none may enter through the ports 396 and 394. This further reduces the amount of air available in the housing 46 by further restricting the source of air to the bleed port 179 which is admitting air to the housing. It should be apparent that the sequential actuation of the first, second and third advance solenoids provide a decreasing amount of air pressure to the valve 28B to modulate the vacuum in line 26 acting on the bellows 18 and thereby an increasing rate of advance of the throttle lever 12. Although only three advance solenoids have been shown, any number of advance solenoid stages might be utilized to give the desired number of different throttle advance rates by providing additional solenoids which would be closed by engagement of the switch 348 with additional solenoid actuating contacts.

Figure 8:
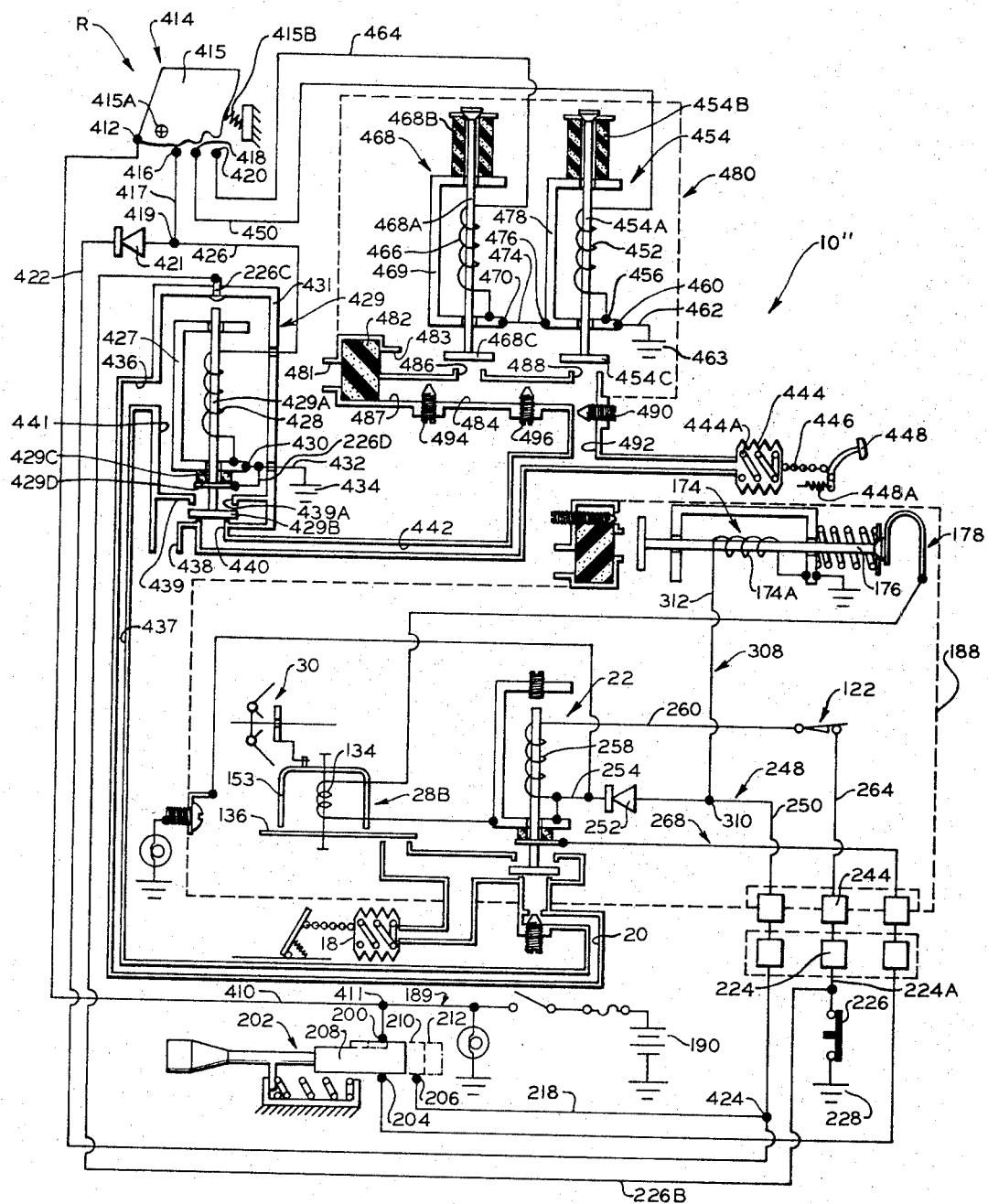
FIG. 8 is a schematic illustration similar to FIG. 6 of a speed control device having a modulated retard.

FIG. 8 illustrates a speed control system generally denoted 10" wherein modulated retard is provided so that the vehicle speed may be reduced at a predetermined rate. In the system 10" the portion of the control and actuating elements disposed in the enclosure 188 and thereby the housing 46 are exactly the same as those described in system 10, additional retard control and actuating elements indicated generally at R being provided exteriorly of the enclosure 188 to provide the modulated throttle retard function of the system 10".

A lead 410 attached to the lead 189 at a contact 411 provides electrical supply from battery 190 for a three-position modulating retard switch 414 connected thereto at contact 412. The three-position switch 414 includes a pivotable contactor 415 pivotally mounted about a pivot pin 415A and pivotable clockwise from an upright position, to which it is biased by spring 415B, to sequentially engage contacts 416, 418 and 420 to provide the modulated retard function. Contact 416 is attached to a lead 417 which extends to a contact 419 disposed in a lead 426. Lead 426 extends leftwardly to a silicon diode 421, acting as a one-way valve, to which is attached a lead 422. The lead 422 extends to and is connected to the vacuum solenoid actuating circuit 248 by contact 424 in lead 218.

The rightward extension of lead 426 is attached to a vacuum solenoid control coil 428 of a vacuum solenoid valve 429. Solenoid coil 428 is attached, in turn, to a contact 430 on a conductive frame 427 of the solenoid which in turn is connected to a lead 432 that extends to ground at 434. The solenoid valve 429 is disposed in a housing 431 having three ports 436, 438 and 440. Port 438 is connected to a supply of negative pressure through any conventional means such as a rubber tube or the like (not shown) and opens into a passage 439 in the housing 431 that leads to a passage 441 connected to the port 436. The port 436 supplies negative pressure through a conduit 437 to the supply line 20 for ultimate conduction to the bellows 18.

An armature 429A of the vacuum solenoid 429 has a plunger 429B thereon which is disposed so as to be normally moved downwardly by an annular elastomeric spring 429C disposed between the frame 427 and a flange 429D carried on the armature to close the port 440 from the passage 439 and open a port 439A lying between the passage 439 and the passage 441, and to be movable upwardly by the energized coil 428 to open the port 440 and close the port 439A. A supply line 442 attached to the port 440 connects the latter to a bellows 444 and, thus, provides for the passage of negative pressure to the bellows 444; the latter being connected by any suitable one-way linkage such as a bead chain 446 to a brake linkage 448. The bellows 444, upon negative pressure being conducted thereto, collapses and by means of the chain 446 pulls the brake linkage 448 counterclockwise to apply the brakes; the force appliable by the bellows depending upon the degree of negative pressure therein. The bellows 444 also includes an internal coil spring 444A adapted to expand the bellows in the absence of negative pressure therein, whereby the bellows no longer imposes a force on the brake linkage 448, and the brake return spring 448A returns the linkage 448 clockwise to its brake release position. Because of the bead chain 446, the brake linkage 448 may override the bellows 444.

The arrangement of the solenoid valve 429 and the flow passages for negative pressure within the housing 431 are such that negative pressure is free to flow to the supply line 20 from the port 438 through the passages 439 and 441 and the port 436 until the solenoid coil 428 is energized to open the port 440 and close the port 439A, which terminates the supply of negative pressure to supply line 20 for the bellows 18 controlling the throttle lever 12, while, with port 440 open, negative pressure from the port 438 to the port 440 and through line 442 to the bellows 444 so that the vehicle is braked by the action of the bellows 444 on the brake linkage 448.

Means is provided to modulate the negative pressure being supplied to the bellows 444 by the supply line 442 so that the force applied by the bellows upon the brake linkage 448 may be controlled; it should be noted that absent any modulating means, the full negative pressure available from the source (not shown) would be supplied to the bellows 444 upon the energization of the coil 428 of solenoid valve 429.

More particularly, a conduit 492 is confluently connected to the supply line 442 upstream of the bellows 444 and is adapted to admit atmospheric pressure to the line 442. A source of filtered atmospheric pressure is provided for the conduit 492 in the form of a housing 480 having a port 481 therein through which atmospheric pressure may enter the housing. A filter 482 is disposed in the housing immediately inwardly of the port 481 so that air pressure entering the housing through a port 483 must flow through the filter 482. A supply conduit 484 is disposed in the housing 480 with one end thereof confluently connected to the conduit 492 and the opposite end thereof forming a port 487 adjacent the port 483 and arranged so as to be supplied with air pressure from a portion of the filter 482. The conduit 484 is also supplied with a pair of ports 486 and 488 through which air pressure in the housing may also enter the conduit 484. Thus, air pressure may enter the conduit 484 from a possible three sources to flow through the conduit 492 and thereby modulate the negative pressure in supply line 442.

Means in the form of a pair of solenoid valves 454 and 468 are provided to control the flow of atmospheric pressure through the ports 488 and 486 respectively and thereby vary the modulating ability of the conduit 492. The solenoid valve 454 includes an armature 454A which is normally biased upwardly by an annular elastomeric spring 454B compressed between a frame 478 of the solenoid and a flange on the upper end of the armature 454A. The valve 454 also includes a coil 452 which is adapted, when energized, to move the armature 454A downwardly so that a plunger 454C carried on the lower end of the armature may cover the port 488. The valve 468 includes an armature 468A which is biased upwardly by a spring 468B disposed between a frame 469 of the valve and a flange on the upper end of the armature 468A. A solenoid coil 466 of the valve 468 is adapted, when energized, to move the armature 468A downwardly so that a plunger 468C on the lower end of the armature may cover the port 486 and thereby prevent air pressure from entering the same into the conduit 484.

Accordingly, prior to energization of the solenoid valves 454 and 468 the conduit 484 may receive atmospheric pressure from the port 487 at the outer end thereof in addition to the ports 486 and 488. When the solenoid valve 454 is energized, the port 488 will be closed so that pressure may only flow through the port 486 and the port 487. When the solenoids 454 and 468 are energized, pressure may enter the conduit 484 only through the port 487.

A plurality of adjustable orifice means are provided to control the amount of pressure introduced by the conduit 492. A first orifice means represented schematically by the adjusting screw 490 is provided in the conduit 492 to control the amount of pressure flowing through this conduit from all of the sources available therefor. A second orifice means shown by the adjusting screw 496 is received in the conduit 484 intermediate the ports 486 and 488 and is operative to adjust the flow of pressure from the ports 486 and 487, while a third orifice means in the form of adjusting screw 494 is provided between the ports 486 and 487 and is operative to adjust the pressure flowing through the conduit 484 from the port 487.

The operation of the system 10″ for manual speed setting, throttle advance, and throttle retard is the same as that described for the system 10 (see FIG. 6) and utilizes the switch 202.

Controlled modulated retard of the vehicle speed, that is, controlled modulation of the rate of vehicle braking, is provided by the modulated retard switch 414 and the circuits operatively connected to the solenoid valves 429, 454 and 468. More particularly, upon pivoting of the contractor 415 into engagement with the contact 416, current flows to the coil 428 of the solenoid valve 429 from the lead 410, through the contactor 415 and then to the contact 416, and through the leads 417 and 426 to the coil 428; the circuit to ground at 434 from the coil 428 is provided by the contact 430 on the frame 427 and through the frame 427 and lead 432. The coil 428, thus energized, the armature 429A moves upwardly so that the plunger 429B closes port 439A preventing negative pressure from flowing from the line 438 to the supply line 20, while the plunger 429B moves from the port 440 so that negative pressure flows from line 438 and through the conduit 442 to the bellows 444. Since the ports 486 and 488 are normally open, conduit 492 receives atmospheric pressure through all three ports 487, 486 and 488, and maximum modulation of the negative pressure in conduit 442 is obtained which results in minimum negative pressure being supplied to the bellows 444.

Further depression of the contactor 415 brings the same into simultaneous engagement with the contacts 416 and 418 to energize the solenoid valve 454 simultaneously with the energization of the valve 429. The contact 418 is connected to the coil 452 of the valve 454 by a lead 450, the coil is connected by a contact 456 to the conductive frame 478, while the frame is connected to a lead 462 at a contact 460 and the lead 462 connects to ground at 463 so that engagement of the contactor 415 with contact 418 energizes coil 452 to move the armature 454A downwardly, whereby the plunger 454C covers port 488 and modulating atmosphere enters conduit 492 from only ports 486 and 487. Thus, a lesser amount of atmospheric pressure enters conduit line 442 when contacts 416 and 418 are engaged than when only contact 416 is engaged, and a greater negative pressure is supplied to bellows 444 than when only solenoid valve 429 was energized and the bellows imposes a greater force urging the brake linkage 448 counterclockwise.

Further depression of the contactor 415 brings the same into simultaneous engagement with the contacts 416, 418 and 420 to simultaneously energize the valves 429, 454 and 468. The contactor 415 supplies current to the contact 420 which in turn is connected to the coil 466 of the valve 468 by a lead 464, while the coil 466 is connected to the conductive frame 469 at a contact 470, a lead 474 connected to the contact 470 is connected to the frame 478 at a contact 476 and the frame 478 is connected by the lead 462 to ground at 463.

With all three solenoids 429, 454 and 468 energized, conduit 492 is supplied with pressure from only port 487 so that the minimum amount of air pressure is supplied to modulate the negative pressure in conduit 442 and maximum negative pressure is supplied to bellows 444, whereby the latter imposes maximum force upon the linkage 448 to retard the vehicle.

Means are provided connecting the switch 414 of the modulated retard circuit R to the actuating circuit 248 of the vacuum solenoid valve 22 and to the advance circuit 308 so that during modulated retard, the coupling coil 134 of modulating valve 28B will be de-energized and, with the actuating circuit 248 energized, at the discontinuance of retard the holding circuit 268 will lock in the valve 22 and the coupling coil 134 and speed regulating will occur at the retarded speed. More particularly, the lead 422 which is connected to the diode 421 is also connected at a contact 424 to the lead 218 of the circuit 248. Thus, upon engagement of the contact 416 by the contactor 415, current is sent to the solenoid valve 429, as previously described, and simultaneously supplied to the lead 218 in the circuit 248. Current in the lead 218 flows to a lead 250 and then to the diode 252, the lead 254 and to the coil 258. The coil 258, on its ground side, is connected by the lead 260, the low speed switch 122 and the lead 264 to the terminal 244 which is connected to the terminal 224. Since the modulated retard circuit R actuates the brake linkage 448, the brake switch 226 will be open at this time and coil 258 can not go to ground at 228 through the open brake switch. Accordingly, the system 10″ provides an alternate or bypass ground in the form of a lead 226B connected to a lead 224A which extends between the terminal 224 and the switch 226. The lead 226B extends to a contactor 226C riveted in the top of the housing 431, which contactor is engaged by the top of armature 429A when the solenoid valve 429 is actuated during modulated retard. A lead 226D is connected to a conductive flange conductively secured to the armature 429A, which lead connects to the lead 432 and the latter lead connects to ground at 434.

Lead 422 also supplies current to the advance circuit 308 which is connected to the vacuum actuating circuit 248 at the contact 310. The lead 312 of the circuit 308 connects to the coil 174A of the valve 174 and, upon the coil 174A being energized, moves the armature 176 to the left to open the switch 178. The opening of the switch 178 disconnects the coupling coil 134 from ground, as previously described with respect to FIGS. 1–6, so that the coil 134 becomes de-energized and bracket 153 is disconnected from the valve plate 136. Thus, during modulated retard, the governor 30 may move the bracket 153 independently of the valve plate 136 and, upon termination of retard and with the current in circuit 308 terminated and switch 178 becoming closed, ground is once again supplied for coil 134 and the bracket 153 becomes locked to the plate 136 to control the vehicle speed at the retarded setting.

During modulated retard, merely because the vacuum solenoid valve 22 and the advance solenoid 174 are being energized, such do not affect the retard since the valve 429 has disconnected the flow of negative pressure from the supply line 438 to the supply line 20 and, thus, there is no negative pressure to be supplied to bellows 18. At the end of modulated retard, the valve 429 again supplies negative pressure to the line 20 and, since the switch 202 in its normal position is engaging contacts 200 and 204 and thereby energizing holding circuit 268 and the actuating circuit 248 having been energized during retard, the holding circuit 268 is effective to hold the solenoid 22 energized and to energize the coupling coil 134 whereby the vehicle is controlled at the retarded set speed without manipulation of the switch 202. Thus, the actuating circuit 248 and the holding circuit 268 can be energized by the modulating retard switch 414 whether or not the solenoid 22 was previously locked in by the holding circuit.

The diode 421 operates as a one-way valve so that while current can flow from the lead 417 through the diode, then through lead 422 and through the latter to the circuits 248 and 308, current from the lead 218 can not flow in the reverse direction through the diode 421 to lead 426 to actuate modulated retard.

In FIG. 9, a control system 10''' is shown which provides for manual speed setting, throttle retard, modulated advance and modulated retard. Basically, the portion of the system 10''' to the left of the vertical line Z—Z is the same as the modulated advance control system 10' shown in FIG. 7 with the very minor exceptions hereinafter referred to. The retard position R' of the system 10''' to the right of the line Z—Z is the same as the retard control and actuating elements indicated at R in FIG. 8 with the very minor exceptions hereinafter referred to.

Power for the retard switch 414 of the portion R' is provided by a lead 500 which joins to the lead 347 at a contact 501, the lead 347 being the lead supplying current from the lead 189 to the advance switch 349; the other end of the lead 500 joining to the contactor 415.

In the control system 10'' shown in FIG. 8, the lead 422 connected to the circuits 248 and 308 by joining to the lead 218 at a contact 424, whereas in the control system 10''' shown in FIG. 9, a similarly functioning lead 422' from the diode 421 connects to the lead 356 from the contact 350; the lead 356 extending from the contact 350 to the lead 342 of the circuit 308'. Accordingly, upon the contactor 415 engaging the contact 416 to actuate modulated retard, current flows not only to the solenoid valve 429 through the leads 417 and 426 but also simultaneously flows to the circuit 308' through the lead 417, the diode 421, the leads 422' and 356 to contact 232 which joins with the lead 342. The lead 342 then joins with the leads 340 and 336 at the contact 338 so that both the advance solenoid 174 and the vacuum solenoid 22 are actuated. Actuation of the advance solenoid 174 opens the switch 178 so the grounding circuit for the coupling coil 134 is open and the bracket 153 is uncoupled from the valve plate 136 whenever modulated retard is actuated for the same purposes as explained with respect to the system 10''.

The diode 421 acts as a one-way valve so that, when the advance switch 348 is actuated, current can not flow from the lead 422' to the lead 426 to actuate the retard circuit R'. While the reverse of the above operation is possible, that is, actuation of the retard circuit R' will supply current to the advance circuit 308' and the circuit for the vacuum coil 22, the advance circuit and vacuum coil circuit can not operate the bellows 18 since the solenoid valve 429 of the retard portion R', when actuated, prevents negative pressure from flowing from the supply line 438 to the supply line 20 to actuate the bellows 18.

While several embodiments of this invention have been shown and described, it is readily apparent that many changes can be made therein without departing from the scope of this invention as defined in the following claims.

What is claimed is:

1. A device for operating a throttle control element of an automotive vehicle comprising in combination, (a) a servo motor means for operating the throttle control element, (b) a source of first fluidic means for said servo motor means and operative upon being supplied to said servo motor to energize the latter to advance the throttle control element, (c) first conducting means for confluently connecting said first source to said servo motor means, (d) a source of second fluidic means, (e) second conducting means connecting said second source to said first conducting means for supplying said second fluidic means to said first conducting means, (f) said second fluidic means being opposite said first fluidic means in a pressure sense and thereby operative to modulate said first fluidic means, (g) said second conducting means including means for varying the flow therethrough of said second fluidic means, (h) means responsive to the speed of the vehicle and connectable to said varying means, (i) energizeable coupling means for coupling said speed responsive means to said varying means at the speed at which the vehicle is to be controlled and including means for energizing said coupling means, (j) said speed responsive means being operable when coupled to said varying means to operate the latter for increasing and decreasing the flow of said second fluidic means in response to the increase and decrease of the vehicle speed, respectively, and, (k) advance means including a manually actuable control means for decreasing the flow of said second fluidic means and de-energizing said coupling means whereby the first fluidic means operates said servo motor means to advance the throttle control element.

2. A device for operating a throttle control element of an automotive vehicle comprising in combination, (a) a source of first fluidic means, (b) a servo motor means including linkage means connecting the same to said throttle control element, (c) said servo motor means being operable upon the supply thereto of said first fluidic means to impose a force on said control element tending to move the same in a throttle advancing direction, (d) first conducting means connecting said first source to said servo motor, (e) first valve means in said first conducting means for controlling the flow of said first fluidic means therein from said first source to said servo motor means, (f) a source of modulating fluidic means, (g) second conducting means connecting said modulating source to said first conducting means, (h) said modulating fluidic means being operable upon admission to said first conducting means to modulate said first fluidic means and reduce the effectiveness thereof to operate said servo motor means, (i) modulating valve means disposed in said second conducting means for controlling the flow of said modulating fluidic means to said first conducting means, (j) speed responsive means for operating said modulating valve means in a manner to increase and decrease the flow of said modulating fluidic means in response to increase and decrease in the speed of the vehicle, respectively, (k) coupling means for coupling said speed responsive means to said modulating valve means, (l) control means for energizing said coupling means and said first valve means at a determined vehicle speed, (m) advance means for reducing the effectiveness of said modulating valve means to supply modulating fluid to said first conducting means, and, (n) control means for actuating said advance means and uncoupling said coupling means for advancing said servo motor means independent of said speed responsive means.

3. A device for operating a throttle control element of an automotive vehicle comprising in combination, (a) servo motor means for operating the throttle control element, (b) a source of first fluidic means for said servo motor means and operative on being supplied to said servo motor means to energize the latter to advance the throttle control element, (c) first conducting means for confluently connecting said first source to said servo motor means, (d) a source of second fluidic means, (e) second conducting means connecting said second source to said first conducting means for supplying said second fluidic means to said first conducting means, (f) said second fluidic means being opposite said first fluidic means in a pressure sense and thereby operative to modulate said first fluidic means (g) said second source including means for progressively closing off a portion of said second source to progressively decrease the rate of flow therefrom of said fluidic means to said second conducting means, (h) said second conducting means including means for varying the flow therethrough of said second fluidic means, (i) means responsive to the speed of the vehicle and connectable to said varying means, (j) energizeable coupling means for coupling said speed responsive means to said varying means at the speed at which the vehicle is to be controlled and including means for energizing said coupling means, (k) said speed responsive means being operable when coupled to said varying means to operate the latter for increasing and decreasing flow of said second fluidic means in response to the increase and decrease of the vehicle speed, respectively, and, (l) modulated advance means including a manually actuable control means for energizing said means for progressively closing off a portion of said second source for decreasing the flow of said second fluidic means and varying the rate thereof and de-energizing said coupling means whereby said varying means remains partially open and said first fluidic means operates said servo motor means to advance the throttle control element.

4. A device for operating a control element of an automotive vehicle comprising in combination, (a) a source of first fluidic means, (b) a servo motor means including linkage means connecting the same to said control element, (c) said servo motor means being operable upon the supply thereto of said first fluidic means to impose a force on said control element tending to move the same in a given direction, (d) first conducting means connecting said first source of said servo motor, (e) a source of second fluidic means, (f) second conducting means connecting said second source to said first conducting means for supplying said second fluidic means to said first conducting means, (g) said second conducting means including means for varying the flow therethrough of said second fluidic means, (h) said second fluidic means being opposite said first fluidic means in a pressure sense and thereby operative to modulate said first fluidic means, (i) means disposed in said second conducting means for progressively closing off a portion of said source of second fluidic means whereby said means provides a varying rate of said second fluidic means to said varying means and thereby said first fluidic means, and, (j) said means for progressively closing off a portion of said source of second fluidic means comprises a series of solenoid valves operative in sequential order.

5. The combination set out in claim 4 wherein said second conducting means includes bleed valve means for providing a bypass flow of said second fluidic means at all times.

6. The combination set out in claim 4 wherein said second source of fluidic means comprises an atmospheric pressure source and said first source of fluidic means comprises a manifold negative pressure source in said automotive vehicle.

7. A device for operating the brake and throttle control elements of an automotive vehicle comprising in combination, (a) first servo motor means for operating the brake control element, (b) a source of first fluidic means for said servo motor means and operative on being supplied to said servo motor to energize the latter to advance the brake control element in a braking direction, (c) first conducting means for confluently connecting said first source to said servo motor means, (d) said first conducting means including valve means moveable to open and closed position for permitting and preventing supply of said first fluidic means to said first servo motor, respectively, (e) a source of second fluidic means, (f) second conducting means connecting said second source to said first conducting means for supplying said second fluidic means to said first conducting means, (g) said second fluidic means being opposite said first fluidic means in a pressure sense thereby operative to modulate said first fluidic means, (h) means for progressively closing off a portion of said source of second fluidic means for varying the rate of modulation of said first fluidic means, (i) third conducting means for confluently connecting said first fluidic means to said valve means, (j) said valve means when positioned to prevent supply of said first fluidic means to said first servo motor permitting supply of said first fluidic means to said third conducting means and when positioned to permit supply to said first fluidic means preventing supply to said third conducting means, (k) second servo motor means connected to said third conducting means for operating a throttle control element, (l) fourth conducting means for connecting said second source of fluidic means to said third conducting means, (m) said fourth conducting means including means for varying of flow therethrough from said second fluidic means, (n) means responsive to the speed of the vehicle and connectable to said varying means, (o) energizeable coupling means to couple said speed responsive means to said varying means at the speed at which the vehicle is to be controlled and including means energizing said coupling means, (p) said speed responsive means being operable when coupled to said varying means to operate the latter for increasing and decreasing the flow of said second fluidic means in response to the increase and decrease of vehicle speed, respectively, and, (q) modulated retard means including a manually actuable control means for moving said valve means to said open position and for decoupling said coil whereby the first fluidic means operates said first servo motor means to advance the brake control element and said first fluidic means is prevented from operating said second servo motor to advance said throttle control element.

8. The combination set forth in claim 7 wherein said valve means comprises a solenoid valve element that alternately seals against a first valve seat contiguous to a first port in said first conducting means and a second valve seat contiguous to a second port in said third conducting means.

9. The combination set forth in claim 7 wherein the means for progressively closing off a portion of the said source of second fluidic means comprises a series of valve means progressively and sequentially actuated for closing off portions of the flow path of said second conducting means whereby the rate of flow of said second fluidic means to said first conducting means may be varied.

10. The combination set forth in claim 7 wherein said manually actuated control means comprises a multi-position switch means for controlling the actuation of said means for progressively closing off a portion of said source of second fluidic means.

11. The combination set forth in claim 7 wherein said second conducting means includes bleed valve means for permitting bypass of a portion of flow from said second fluidic means at all times.

12. The combination set forth in claim 7 wherein said varying means includes shutter valve means disposed adjacent a port in said fourth conducting means.

13. The combination set forth in claim 7 wherein said second source of fluidic means comprises an atmospheric pressure source and said first source of fluidic means comprises a manifold negative pressure source in said automotive vehicle.

14. The combination set forth in claim 7 wherein said fourth conducting means includes means for progressively closing off portions of said second source of fluidic means.

15. A device for operating the brake control element of an automotive vehicle comprising in combination, (a) servo motor means for operating the brake control element, (b) a source of first fluid means for said servo motor means and operative on being supplied to said servo motor to energize the latter to advance the brake control element in a braking direction, (c) first conducting means for confluently connecting said first source to said servo motor means including first valve means moveable to open and closed position for permitting and preventing a supply of said first fluidic means to said servo motor means, (d) a source of second fluidic means, (e) second conducting means connecting said second source to said first conducting means for supplying said second fluidic means to said first conducting means, (f) said second fluidic means being opposite said first fluidic means in a pressure sense thereby operative to modulate said first fluidic means, (g) said second conducting means including means for progressively closing off a portion of said source of second fluidic means for varying the rate of modulation of said first fluidic means, and (h) modulated retard means including a manually actuable control means for energizing said first valve means and said means for progressively closing off a portion of said source of second fluidic means whereby said first fluidic means operates said servo motor means to advance the brake control element at a varying rate.

16. The combination set out in claim 15 wherein the means for progressively closing off a portion of said source of second fluidic means comprises a series of sequentially operated valve means.

17. The combination set forth in claim 15 wherein said manually actuated control means includes a switch means for actuating said means for progressively closing off a portion of said source of second fluidic means.

18. The combination set out in claim 15 wherein said second conducting means includes bypass means for said second fluidic source.

19. The combination set out in claim 15 wherein said second source of fluidic means comprises an atmospheric pressure source and said first source of fluidic means comprises a manifold negative pressure source in said automotive vehicle.

20. A speed regulating system having manual throttle lock in, throttle advance and throttle retard including, (a) servo motor means for controlling an engine throttle setting, (b) pressure source means for supplying a negative pressure to said servo motor means, (c) first solenoid valve means for alternately permitting and interrupting flow from said negative pressure source to said servo motor (d) modulating valve means for imposing atmospheric pressure on said servo motor, (e) regulator means including a coupling coil for controlling the position of said modulating valve means, (f) second solenoid valve means for interrupting and permitting a flow of atmospheric air to said modulating valve means, (g) a first actuating circuit for moving said first solenoid means to a position for permitting flow of said negative pressure to said servo motor, (h) a holding circuit for maintaining said first solenoid valve means in said negative pressure supplying position, (i) a coupling circuit connected to said holding circuit for magnetically locking said coupling coil to said modulating valve to place said regulator means in regulating condition, (j) a second actuating circuit for moving said second solenoid valve means into atmospheric air flow interruption position, (k) said second actuating circuit electrically connected to said first actuating circuit for simultaneous actuation thereof, (l) said second actuating circuit being connected to said holding circuit but electrically isolated therefrom by diode means to prevent feedback from said holding circuit, and, (m) a multi-position switch means for interrupting and providing current to said first actuating circuit and said holding circuit.

21. A speed regulating system as set forth in claim 20 wherein, (a) said multi-position switch means has a first, second, and third position, (b) said multi-position switch in said first position electrically connects a power source and said first solenoid actuating circuit, (c) said multi-position switch in said second position electrically connects said power source and said holding circuit, and, (d) said multi-position switch in said third position is disconnected from said power source.

22. A speed regulating system having manual throttle lock in, throttle advance and modulated throttle retard including, (a) first servo motor means for controlling an engine throttle setting, (b) pressure source means for supplying negative pressure to said servo motor means, (c) first solenoid valve means for alternately permitting and interrupting imposition of said pressure source on said servo motor, (d) modulating valve means for imposing atmospheric pressure on said servo motor, (e) second servo motor means for controlling vehicular brake lever setting, (f) second solenoid valve means for alternately permitting and interrupting flow from said negative pressure source to said last mentioned servo motor means, (g) modulating means comprising a plurality of solenoid valves for varying flow of atmospheric pressure to saaid second servo motor means, (h) solenoid valve means for permitting and interrupting a flow of atmospheric air to said first servo motor means, (i) means connecting said first and second solenoid valve means for interrupting flow of vacuum pressure to said first servo motor means when said second servo motor means is actuated, and, (j) electrical circuit means for actuating and controlling said first and second solenoid valve means, said modulating valve means, and said plurality of solenoid valve means of said modulating means.

23. A speed regulating system having manual throttle lock in, throttle retard and modulated throttle advance including, (a) servo motor means for controlling an engine throttle setting, (b) pressure source means for supplying negative pressure to said servo motor means, (c) first solenoid valve means for alternately permitting and interrupting flow from said negative pressure source to said servo motor, (d) modulated valve means for imposing atmospheric pressure on said servo motor, (e) regulator means including a coupling coil for controlling the position of said modulating valve means, (f) second solenoid valve means for interrupting and permitting a flow of atmospheric air to said modulating valve means, (g) said second solenoid valve means comprising a series of solenoid valves capable of being sequentially operated for opening and closing off portions of said flow of atmospheric air, (h) a first actuating circuit for moving said first solenoid valve means to a position for permitting flow of said negative pressure to said servo motor, (i) a holding circuit for maintaining said first solenoid valve means in said negative pressure supplying position, (j) a coupling circuit connected to said holidng circuit for magnetically locking said coupling coil to said modulating valve to brace said regulator means in regulating position, (k) a second actuating circuit for moving said second solenoid valve means sequentially into atmospheric air flow interruption position, (l) said second actuating circuit being electrically connected to said first actuating circuit for the flow of current therefrom to said first actuating circuit, (m) said first actuating circuit electrically isolated from said second actuating circuit for current flow therefrom to said second actuating circuit by diode means, and, (n) a multi-position switch means for interrupting and providing current to said second actuating circuit for actuating said first and second solenoid valve means to provide for modulated advance of said throttle setting.

24. A speed regulating system having manual throttle lock in, throttle advance and modulated throttle retard including, (a) first servo motor means for controlling an engine throttle setting, (b) pressure source means for supplying a negative pressure to said servo motor means to advance said throttle setting, (c) first solenoid valve means for alternately permitting and interrupting flow from said negative pressure source to said servo motor, (d) modulating valve means for imposing atmospheric pressure on said servo motor, (e) regulator means including a coupling coil for controlling the position of said modulating valve means, (f) second solenoid valve means for permitting and interrupting flow of atmospheric air to said modulating valve means, (g) second servo motor means for controlling a brake element setting, (h) said pressure source means for supplying a negative pressure supplying the same to said second servo motor means to move said brake element in vehicle decelerating direction, (i) third solenoid valve means disposed between said negative pressure source means and said first solenoid valve means for alternately permitting and interrupting flow from said negative pressure source to said second servo motor means, (j) said third solenoid valve means when positioned to permit flow between said negative pressure source and said second servo motor means preventing flow between said negative pressure source and said first servo motor means whereby actuation of said brake element in a braking direction positively prevents simultaneous advance of said throttle setting, (k) fourth solenoid valve means for interrupting and permitting flow of atmospheric air to said second servo motor, (l) said fourth solenoid valve means including a series of solenoid valves sequentially operable to provide varying rates of atmospheric air flow to said second servo motor thereby varying the rate of vehicle braking, (m) a first actuating circuit for moving said first solenoid valve means to a position for permitting flow of said negative pressure to said servo motor, (n) a holding circuit for maintaining said first solenoid valve means in said negative pressure supplying position, (o) a coupling circuit connected to said holding circuit for magnetically locking said coupling coil to said modulating valve to place said regulator means in regulating condition, (p) a second actuating circuit for moving said second solenoid valve means into atmospheric air flow interruption position (q) said second actuating circuit electrically connected to said first actuating circuit for simultaneous actuation thereof, (r) said second actuating circuit being connected to said holding circuit and electrically isolated therefrom by first diode means to prevent feedback from said holding circuit, (s) a first multi-position switch means for interrupting and providing current to said first actuating circuit and said holding circuit, (t) a third actuating circuit for moving said third solenoid valve means to a postion for permitting flow of negative pressure to said second servo motor means and for decoupling said coupling coil, (u) said third actuating circuit electrically connected to said first solenoid actuating circuit, (v) a second diode disposed in said third actuating circuit to prevent actuation of said third solenoid means when said first solenoid actuating circuit is energized by said first multi-position switch means, (w) a fourth actuating circuit for moving said fourth solenoid valve means sequentially into atmospheric air supply preventing position, and, (x) a second multi-position switch means to actuate said third and fourth actuating circuits.

25. The combination set out in claim 24 wherein said second solenoid valve means includes, (a) a series of solenoid valves for sequentially interrupting a portion of said atmospheric air flow to provide a varying rate of advance of said throttle setting, and, (b) said second actuating circuit includes means for actuating said last mentioned series of solenoid valves sequentially.

26. A speed regulating system having manual throttle lock in, throttle retard and modulated throttle advance including, (a) first servo motor means for controlling engine throttle setting, (b) pressure source means for supplying negative pressure to said servo motor means, (c) first solenoid valve means for alternately permitting and interrupting imposition of said pressure source on said servo motor, (d) modulating valve means for imposing atmospheric pressure on said servo motor, (e) modulating means comprising a plurality of solenoid valves for varying flow of atmospheric pressure to said modulating valve means, and, (f) electrical circuit means for actuating and controlling said first solenoid valve means, said modulating valve means and modulating means.

27. A speed regulating system for manual speed set, modulated speed advance and modulated speed retard including, (a) first servo motor means for controlling an engine throttle setting, (b) second servo motor means for controlling a vehicular brake lever setting, (c) pressure source means for supplying negative pressure to said first and second servo motor means, (d) first solenoid valve means for opening or closing said pressure source means to said first servo motor means, (e) second solenoid valve means for opening and closing said pressure source to said second servo motor means and said first solenoid valve means, (f) modulating valve means for imposing atmospheric pressure on said first servo motor means, (g) modulating means for proportionally limiting the flow of atmospheric air to said modulating valve means, (h) modulating means for proportionally limiting a flow of atmospheric air to said second servo motor means, and, (i) electrically operated means for actuating and controlling said speed regulating system.

28. A circuit for a speed regulating system including, (a) a vacuum solenoid actuating circuit, (b) an advance solenoid circuit electrically coupled to said vacuum solenoid actuating circuit, (c) a solenoid holding circuit connected to said vacuum solenoid actuating circuit, (d) a coupling coil circuit connected to said vacuum solenoid actuating circuit, and, (e) a one-way current passing means disposed between said solenoid holding circuit and said advance solenoid circuit to prevent feedback to said advance solenoid circuit.

29. A circuit for a speed regulating system including, (a) a vacuum solenoid actuating circuit, (b) a solenoid holding circuit connected thereto, (c) a coupling coil circuit electrically connected to said solenoid holding circuit, (d) an advance solenoid circuit means electrically connected to said solenoid holding circuit, and, (e) a one-way current passing means disposed between said holding circuit and said advance circuit to prevent feedback to said advance circuit.

30. A speed regulating system including, (a) first servo motor means for controlling engine throttle setting, (b) pressure source means for supplying fluid pressure to said servo motor means, (c) first solenoid valve means for opening and closing against said pressure supply means, to provide or prevent fluid pressure on said first servo motor means, (d) modulating valve means for imposing a control pressure on said servo motor, (e) second servo motor means for controlling a vehicular brake setting, (f) second solenoid valve means for opening and closing against said pressure supply means to provide or prevent imposition of fluid pressure to said second servo motor, and, (g) modulating means for proportioning flow of said control pressure on said second servo motor means.

31. The speed regulating system set forth in claim 30 wherein said system also includes third solenoid valve means for selectively permitting or preventing flow of said control pressure to said modulating valve means.

32. The speed regulating system of claim 30 wherein said second solenoid valve means, alternately, provides fluid pressure to said first solenoid valve means or to said second servo motor means.

33. A speed regulating system including, (a) first servo motor means for controlling engine throttle setting, (b) pressure source means to provide pressure to servo means, (c) first solenoid valve means for alternately permitting and interrupting imposition of said pressure source on said servo motor, (d) modulating valve means for imposing atmospheric pressure on servo motor, (e) modulating means disposed upstream from said modulating valve means for varying the rate of supply of said atmospheric pressure to said modulating valve means, and, (f) manually actuated electric means for controlling and actuating said first solenoid valve means, said modulating valve means and said modulating means.

(References on following page)

References Cited

UNITED STATES PATENTS

| | | | |
|---|---|---|---|
| 3,068,849 | 12/1962 | Thorner | 123—103 |
| 3,133,610 | 5/1964 | Sheppard | 180—108 |
| 3,195,673 | 7/1965 | Cassano et al. | 180—109 |
| 3,207,252 | 9/1965 | Cripe et al. | 123—103 X |
| 3,243,022 | 3/1966 | Humphrey | 192—3 |
| 3,322,227 | 5/1967 | Thorner | 180—108 |
| 3,324,978 | 6/1967 | Mueller et al. | 180—108 X |
| 3,339,664 | 9/1967 | Beveridge et al. | 180—108 |
| 3,343,423 | 9/1967 | Thorner | 180—109 X |

KENNETH H. BETTS, *Primary Examiner.*